United States Patent [19]
Rubin

[11] Patent Number: 5,412,797
[45] Date of Patent: May 2, 1995

[54] METHOD FOR IMPLEMENTING ONE-TO-MANY BINARY RELATIONS IN OBJECT-ORIENTED SYSTEMS USING DOUBLY-LINKED RINGS

[75] Inventor: William B. Rubin, Poughkeepsie, N.Y.

[73] Assignee: International Business Machines Corporation, Armonk, N.Y.

[21] Appl. No.: 938,075

[22] Filed: Aug. 31, 1992

[51] Int. Cl.$^6$ .................... G06F 13/00; G06F 15/00
[52] U.S. Cl. ........................... 395/500; 395/600; 395/650; 395/700
[58] Field of Search ............... 395/500, 600, 650, 700

[56] References Cited

U.S. PATENT DOCUMENTS

| | | | |
|---|---|---|---|
| 4,853,843 | 8/1989 | Ecklund | 364/200 |
| 5,075,848 | 12/1991 | Lai et al. | 395/425 |
| 5,093,914 | 3/1992 | Coplien et al. | 395/700 |
| 5,095,522 | 3/1992 | Fujita et al. | 395/200 |
| 5,187,786 | 2/1993 | Densmore | 395/600 |
| 5,291,583 | 3/1994 | Bapat | 395/500 |
| 5,291,593 | 3/1994 | Abraham | 395/600 |
| 5,297,279 | 3/1994 | Bannon | 395/600 |
| 5,303,375 | 4/1994 | Collins | 395/600 |

OTHER PUBLICATIONS

Tremblay, "An Introduction to Data Structures with Applications", pp. 345–361 1984.
"The Annotated C++ Reference Manual" (ARM), by Margaret A. Ellis and Bjourne Stroustrup; Addison-Wesley, 1990; Chapter 11, pp. 239–260.

*Primary Examiner*—Thomas G. Black
*Assistant Examiner*—Jean R. Homere
*Attorney, Agent, or Firm*—Lawrence D. Cutter; Blanche E. Schiller

[57] ABSTRACT

An implementation of one-to-many binary relations in an object-oriented database management system and object-oriented data model. The implementation includes storing all the information for the relationships of a relation contiguously inside the related instances, such as a source instance and a sink instance. The information stored within the related instances is used to create a doubly-linked ring of instances. The doubly-linked ring of instances is used in implementing a relation. In order to iterate through a relation, a cursor is employed. Encapsulated within the cursor are various pointers and data members which are used in cursing through the relation. The cursor is type safe and each cursor instance is maintained in a cursor dictionary, providing iteration safety. In addition, the cursor is operational in a forward direction and a backward direction, and the direction of the cursor can be dynamically switched.

33 Claims, 13 Drawing Sheets

METHOD FOR IMPLEMENTING ONE-TO-MANY BINARY RELATIONS IN OBJECT-ORIENTED SYSTEMS USING DOUBLY-LINKED RINGS

TECHNICAL FIELD

This invention in general, to object-oriented systems and, in particular, to a technique for implementing one-to-many relations in object-oriented database management systems and object-oriented data models.

BACKGROUND ART

Object-oriented database management systems are database management systems designed for applications with complex interrelated data and high performance requirements, such as computer aided design (CAD) and computer aided software engineering (CASE). Typically, object-oriented database management systems support object-oriented data models.

In an object-oriented data model, the data structures are encapsulated so that access to and manipulation of data is possible only through well-defined interfaces. The interfaces of an object-oriented data model include support for binary relations between objects. Such relations include, for example, one-to-many binary relations.

Previous implementations of one-to-many relations are based on the use of collection classes. A collection class is an object that stores an arbitrary number of addresses of other objects and allows iteration (or cursing) through those objects. Collection classes are generally implemented using discontiguous arrays of addresses. Management of these arrays requires storage allocation and freeing, as well as complex heuristics. With collection classes, unless special precautions are taken, multiple pointers to the same object will be accepted, thus giving multiple relationships, or worse yet, "halves" of a relationship, between the same two objects. The precautions needed to avoid repeated pointers are expensive in execution time, storage space, and/or complexity.

When a collection class is used in the implementation of a relation technology, it is generally embedded in schema classes. The collection class consumes storage both contiguously in the schema class itself and for the array, discontiguously outside the schema class. This relation technology is referred to as semi-sparse.

In current object-oriented database management systems and object-oriented data models, such as those using collection classes to implement relations, the one-to-many relations suffer from a number of performance and functional limitations. For example, a great deal of processing time is required in order to insert or remove relationships, and to iterate through the relationships. In addition, substantial amounts of storage are required. In many cases, most of the data in a data model comprises relationships, and thus, the amount of disk storage and main memory required for applications depends strongly on the efficiency with which relations can be represented in the data model. Thus, in current systems, system performance is degraded due to the requirement of a large amount of storage and inefficiency in implementing relations.

In addition to the above, in some object-oriented database management systems and data models, the functionality of the one-to-many relations may be limited. That is, some useful functions may be difficult, if not impossible, to provide. These functions include, for example, the ability to prevent the insertion of multiple relationships between the same two objects; the ability of cursors used to iterate through the relations to respond gracefully and predictably to interleaved insertion and/or removal of relationships and to the destruction of the relation fan being traversed; and the ability of cursors to traverse relation fans in both forward and backward directions and to dynamically reverse direction.

Thus, a need exists for a method of implementing relations and a method of implementing cursors which improves performance of the object-oriented database management system and object-oriented data model. A further need exists for a method of implementing relations wherein the information for the relations is stored contiguously within the related objects, thus eliminating the need for discontiguous storage. A yet further need exists for a relation implementation technique in which the amount of processing time and storage required for inserting relationships is decreased. Yet further, a need exists for a technique in which potential duplicate relationships can be detected. Further, a need exists for an iteration technique which allows cursor movement in both a forward and a backward direction and the ability to dynamically reverse the direction of the cursor.

DISCLOSURE OF INVENTION

The shortcomings of the prior art are overcome and additional advantages are provided in accordance with the principles of the present invention through the provision of a method for implementing one-to-many relations in an object-oriented data repository and a method for implementing cursors for use with one-to-many relations.

In accordance with the principles of the present invention, a method for implementing one-to-many relations in an object-oriented data repository includes creating a source instance from a source class, creating a sink instance from a sink class and inserting a relationship between the source instance and the sink instance. The source and sink instances each have an associated address and stored within the source and sink instances are pointers for use in implementing relations. In one embodiment, the pointers stored within the source instance include a first sink pointer and a last sink pointer and the pointers stored within the sink instance include a next sink pointer, a previous sink pointer and a source pointer.

In one embodiment, the inserting step includes setting the source pointer to the address of the source instance and inserting the sink instance into a doubly-linked ring of sink instances. The inserted sink instance includes a next sink pointer and a previous sink pointer stored within the inserted sink instance. In one example, in order to insert the sink instance in the ring, the next sink pointer of the inserted sink instance is set to a pseudo-sink address and a value from the last sink pointer is assigned to the previous sink pointer of the inserted sink instance. Further, if there are no other sink instances, then the first sink pointer is set to the address of the inserted sink address. On the other hand, if there are other sink instances, then the next sink pointer of a sink instance other than the inserted sink instance is set to an address of the inserted sink instance.

In another embodiment, the inserting step includes a determination of whether the relationship already exists.

In yet another embodiment, relationships can be removed by, for example, selecting a sink instance to be removed from a doubly-linked ring of sink instances, setting the source pointer of the selected sink instance to null and removing the selected sink instance from the ring of sink instances.

In another aspect of the invention, a cursor for use in traversing one-to-many relations is implemented. In one example, in order to implement the cursor, a cursor instance is created from a cursor class and the cursor instance is attached to the source instance of a relation. The cursor instance includes one or more pointers, such as a pseudo-sink pointer and a position pointer, for use in traversing relations. The pointers are stored within the cursor instance.

In one embodiment, the cursor instance is advanced by, for example, offsetting the position pointer by a predetermined value such that an offset result is provided, dereferencing the offset result and assigning the offset result to a temporary pointer, determining whether the temporary pointer is equal to the pseudo-sink pointer and advancing the cursor instance by setting the position pointer to the temporary pointer when the temporary pointer is not equal to the pseudo-sink pointer.

In another embodiment, a related instance is returned. In order to return a related instance, a determination is made as to whether the position pointer is equal to the pseudo-sink pointer and if the position pointer is not equal to the pseudo-sink pointer, the position pointer is returned.

In yet another embodiment, the cursor instance is inserted in a cursor dictionary. Further, the cursor is capable of operating in a forward direction and a backward direction, and the operating direction is capable of being dynamically switched.

In another embodiment, a method for implementing one-to-many binary bidirectional relations in an object-oriented data repository is provided. The method includes creating a source instance from a source class and a plurality of sink instances from a sink class, and inserting a relationship between the source instance and each of the sink instances. The source instance has an associated address and includes a first sink pointer and a last sink pointer, both of which are stored within the source instance. The sink instance has an associated address and includes a source pointer, which is stored within the sink instance.

In one embodiment, each of the relationships can be removed by, for example, setting each of the source pointers to null and setting the first sink pointer and the last sink pointer to a pseudo-sink address.

In yet another embodiment, a method for implementing one-to-many binary bidirectional relations in an object-oriented data repository is provided. The method includes creating a source instance from a source class and one or more sink instances from a sink class and using pointers stored within the source instance and sink instances to create a doubly-linked ring of instances. The doubly-linked ring of instances specifies a relationship between the source instance and one or more sink instances.

In another embodiment, a method for implementing one-to-many binary unidirectional relations in an object-oriented data repository is provided. A source instance is created from a source class and a sink instance is created from a sink class and a relationship is inserted between the source instance and the sink instance. Stored within the source instance is a first sink pointer and a last sink pointer and stored within the sink instance is a next sink pointer and a previous sink pointer.

In another aspect of the invention, a method for implementing cursors for use with one-to-many binary relations is provided. A source instance and a cursor instance are created. Stored within the source instance are one or more pointers and stored within the cursor instance are one or more pointers. The cursor instance is attached to the source instance and the cursor instance is advanced. Further, in one embodiment, the cursor instance is inserted in a cursor dictionary.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

BEST MODE FOR CARRYING OUT THE INVENTION

A key component of the known object-oriented paradigm is the use of re-usable components, referred to as objects. An object includes members of specified data types and a set of operations which can be performed on those members. Each object is an instance of a class, which is a user-defined data type.

As described previously, object-oriented database management systems employing the object-oriented paradigm are designed for applications with complex interrelated data and very high performance requirements. Examples of such applications are computer aided design (CAD) and computer aided software engineering (CASE). Typically, object oriented database management systems support object-oriented data models.

Object-oriented data models are models for data using the object-oriented paradigm. In an object-oriented data model, the data structures are encapsulated so that access to and manipulation of data is possible only through well-defined interfaces. (As described in *The Annotated C++ Reference Manual*, by Margaret A. Ellis and Bjourne Stroustrup, Addison-Wesley, 1990, which is hereby incorporated by reference, encapsulation establishes the boundaries around an object, managing the internal state of an object.) Such a model is generally implemented using an object-oriented programming language, such as, for example, C++. The interfaces of an object-oriented data model generally include support for binary bidirectional relations between objects. Object-oriented data models generally provide for inheritance, which refers to the ability to define subclasses.

As used herein, the term "object-oriented data repository" refers to either an object-oriented database management system or an object-oriented data model. In order to navigate (navigate refers to the gaining of addressability to objects from other objects and changing the paths, referred to as relationships, through which the addressability is obtained) through the data of an object-oriented data repository, relations are employed. One technique for implementing relations, and in particular, one-to-many bidirectional binary relations, is described in detail herein, in accordance with the principles of the present invention.

Figure 1:
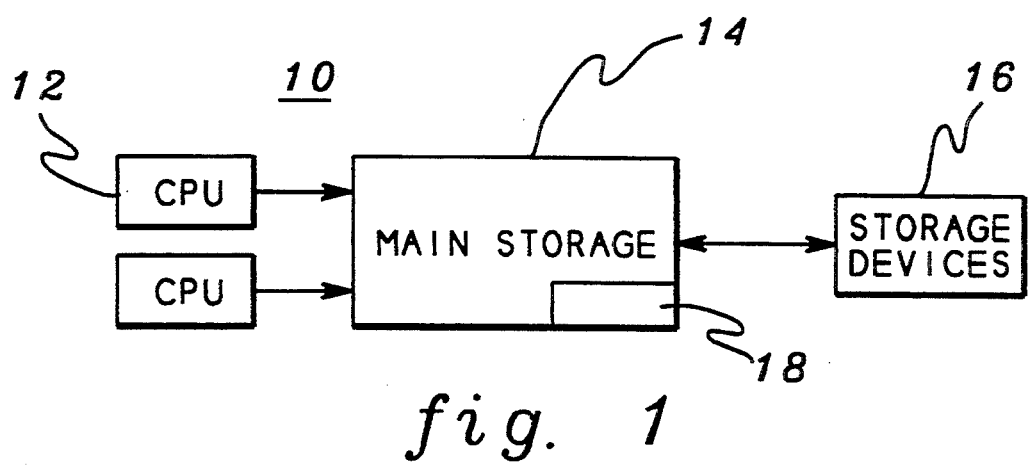
FIG. 1 is one example of a block diagram of a data processing system incorporating the relation and cursor implementation techniques of the present invention.

In one example, the relation implementation technique of the present invention takes place within a data processing system 10 (FIG. 1). System 10 includes, for example, one or more central processing units (CPUs) 12, a main storage 14 and one or more storage devices 16.

Central processing units 12 contain the sequencing and processing facilities for instruction execution, interruptions action, timing functions, initial program loading and other machine related functions. Central processing units 12 are coupled to main storage 14.

Main storage 14 is, for instance, directly addressable and provides for high-speed processing of data by the central processing units. Main storage 14 may be either physically integrated with the central processing unit or constructed in stand-alone units. Main storage 14 includes data and instructions to manipulate the data. In accordance with the principles of the present invention, main storage 14 includes the data structures and procedures 18 of the relation implementation technique and the cursor implementation technique of the present invention. The central processing units access these structures and procedures in order to implement the techniques of the present invention.

Main storage 14 is also coupled to storage devices 16. Data is transferred from main storage 14 to storage devices 16 and from the storage devices back to main storage. The procedures and data structures of the present invention may also be stored in storage devices 16, and brought into main storage, when needed. Storage devices may include, for example, monitors, printers and disks.

Figure 2:
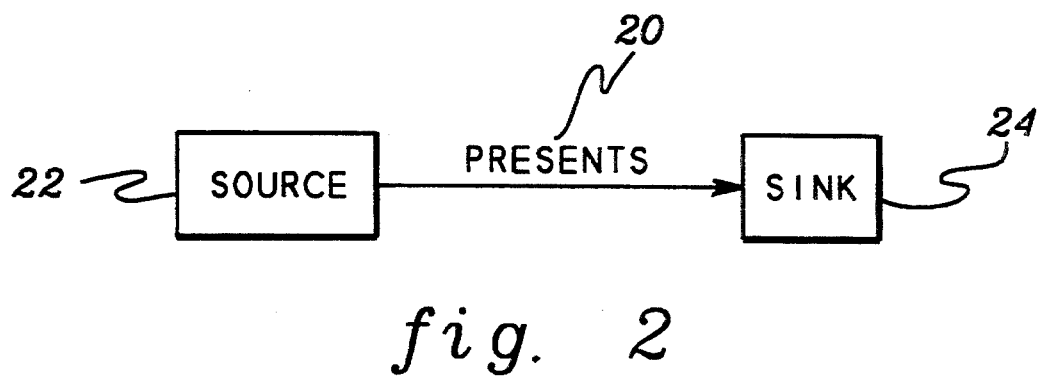
FIG. 2 depicts one example of a schematic diagram of a one-to-many relation of the present invention.
Figure 3:
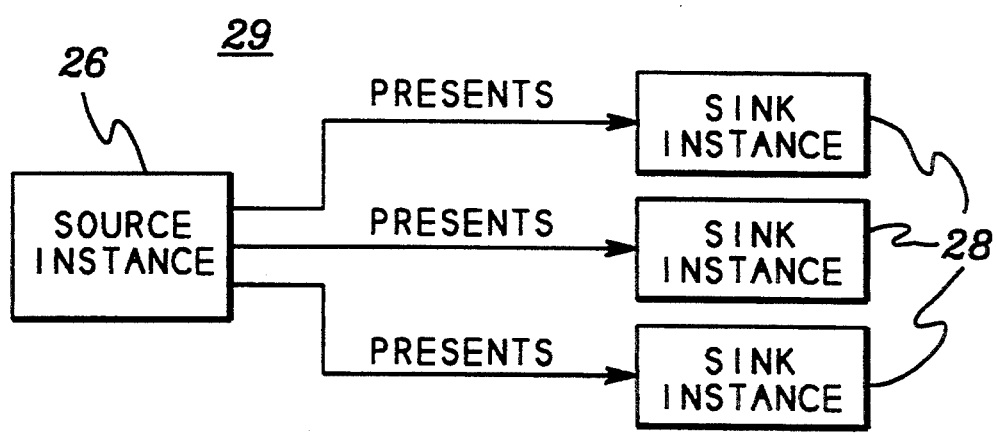
FIG. 3 depicts one example of a relation fan, in accordance with the principles of the present invention.

As used herein, relation refers to a schema concept. For example, as shown in FIG. 2, one example of a one-to-many binary relation 20 is a "presents" relation. In the schema depicted in FIG. 2, a sink class 24 is presented by a source class 22. In particular, one source instance or source object 26 (FIG. 3) of source class 22 "presents" many (i.e., zero or more) sink instances or sink objects 28 of sink class 24. This instance concept is referred to as a relation fan 29. As shown in the example in FIG. 3, one source instance 26 "presents" three sink instances 28. Inversely, one sink instance 28 is presented by, at most, one source instance 26. Relation 20 can be traversed in either direction, and referential integrity (consistency between the two directions) is maintained. It will be apparent to one of ordinary skill in the art that other relations can be implemented by the technique of the present invention without departing from the spirit of the invention. As one illustrative example, a "contains" relation can be implemented. It will also be apparent to one of ordinary skill in the art that each schema class (classes which are part of a relation) may participate in multiple one-to-many relations.

A relation consists of a number of relationships, wherein there exists zero or more relationships between a source instance and various sink instances. As described in detail herein, in order to implement relationships and thus, relations, a number of data structures are defined and used by relation implementation procedures. In accordance with the principles of the present invention, and as described in detail herein, the relationship information is stored contiguously inside the related instances. Thus, storage is consumed whether or not it is used, and the relations are considered dense.

Figure 4:
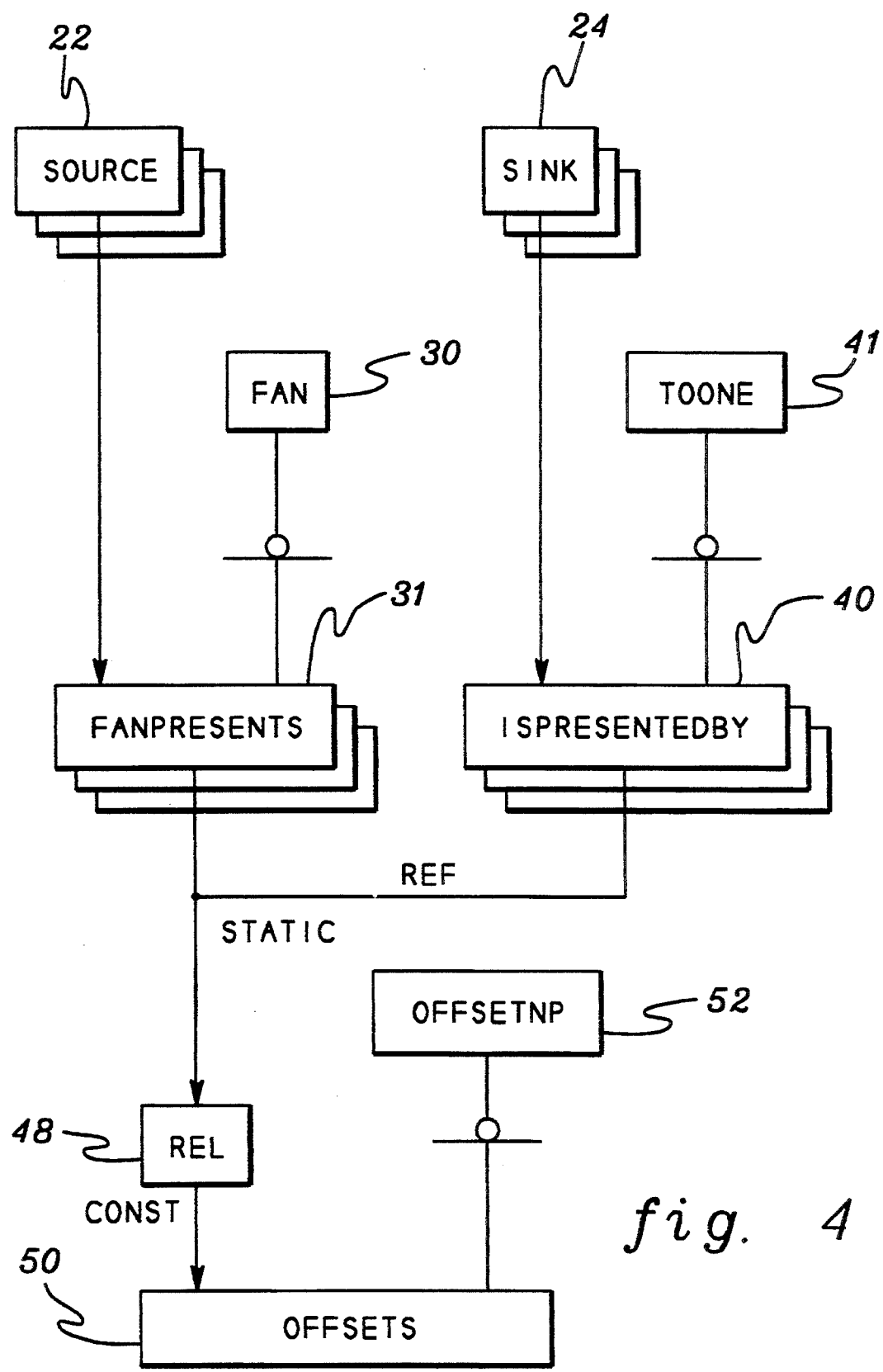
FIG. 4 illustrates one example of a hierarchy and nesting diagram of the various classes associated with the relation implementation technique of the present invention.
Figure 5:
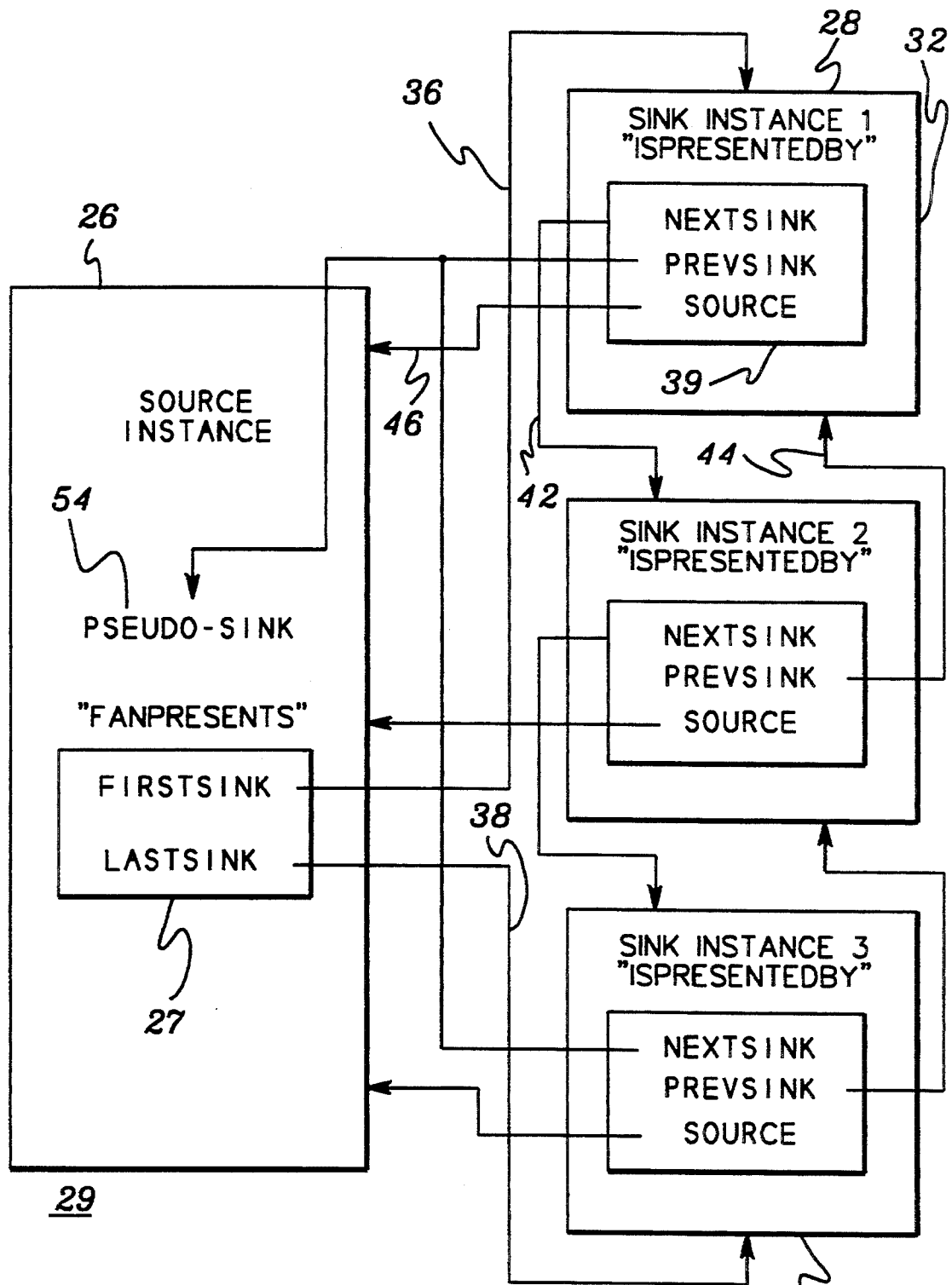
FIG. 5 depicts one example of a doubly-linked ring of related instances, in accordance with the principles of the present invention.

Initially, the data structures of the present invention will be described in detail herein, and then, the procedures for managing the relations and changing the relationships will be described. In describing the data structures of the present invention, reference is made to the hierarchy and nesting diagram of FIG. 4 and the ring diagram of FIG. 5. (In FIG. 5, the arrows pointing to the perimeter of the instances (rectangles) represent pointers to the first byte of the instance and the arrow pointing into the interior of the source instance represents a pointer to the pseudo-sink of the relation fan.) Referring to FIGS. 4 and 5, the classes used to implement the source-presents-sink relation and its inverse are shown and described in detail. (It should be noted that schema classes may have multiple sets of nested class instances corresponding to different relations.) In accordance with the principles of the present invention, source class 22 and sink class 24 are provided. Source class 22 is used to create a number of source objects or instances 26 and sink class 24 is used to create a number of sink objects or instances 28.

Encapsulated within each source instance 26 of source class 22 is an instance 27 of a "FanPresents" class 31. The "FanPresents" class is derived from an abstract base class 30 referred to as "Fan," which includes a pointer 36 (i.e., firstsink pointer) to a first sink 32 and a pointer 38 (i.e., lastsink pointer) to a last sink 34 of a particular relation fan 29. (Since "FanPresents" class 31 is derived from "Fan" class 30, each instance 27 inherits the data members of the "Fan" class.)

Encapsulated within each sink instance 28 of sink class 24 is an instance 39 of an "isPresentedBy" class 40. "IsPresentedBy" class 40 is derived from a base class 41 referred to as "ToOne," which includes a pointer 42 (i.e., nextsink pointer) to a next sink of a particular relation fan 29 (e.g., sink instance 2 is the next sink from sink instance 1), a pointer 44 (i.e., prevsink pointer) to a previous sink (for example, sink 1 is a previous sink from sink 2), and a pointer 46 (i.e., source pointer) to source instance 26. (Since "isPresentedBy" class 40 is derived from "ToOne" class 41, each instance 39 of the "isPresentedBy" class inherits the data members of the "ToOne" class.)

It will be apparent to one of ordinary skill in the art that other classes and subclasses than those described herein may be used in the techniques of the present invention without departing from the spirit of the invention. The classes and subclasses described herein are only illustrative. The use of the terms "source" and "sink" are used in a general sense in order to cover any desired objects or instances. In a similar manner, the subclasses, such as "FanPresents" and "isPresentedBy," are used as examples, since the illustrative relation being implemented is a "presents" relation. Other relations can be implemented in the same manner and may have other classes and subclasses.

Referring back to FIG. 4, in addition to pointers 36, 38, "FanPresents" class 31 also contains a static (static, as used herein, refers to one data member per class, rather than one per instance) "Rel" class member 48 and "isPresentedBy" class 40 contains a static reference (i.e., ref) to the same "Rel" class member 48. Nested within each "Rel" class instance is a "const" instance of "Offsets" class 50. "Const," as used herein, means that the value is fixed and cannot be changed by the programming code after the instance is instantiated.

"Offsets" class 50 is derived from another class 52 referred to as "OffsetNP." "OffsetNP" consists of two unsigned integer data members. These data members include offsetN, which has a value equal to the offset from a particular sink to its next sink pointer 42 and offsetP, which has a value equal to the offset from the sink to its previous sink pointer 44. In addition to the members of "OffsetNP" (i.e., offsetN and offsetP), "Offsets" class 50 includes the following unsigned integer data members, whose values are fixed at compile time:

1. OffsetO having a value equal to the offset from the sink to its source pointer 46;

2. OffsetR having a value equal to the offset from source instance 26 to its first sink pointer 36;
3. OffsetL having a value equal to the offset from source instance 26 to its last sink pointer 38; and
4. Offsets having a value equal to the offset from source instance 26 to its pseudo-sink 54 (FIG. 5). In accordance with the principles of the present invention, pseudo-sink refers to an address near the address of source instance 26. In particular, the pseudo-sink of a particular relation fan is defined to be a location at offset OffsetN above the first sink pointer in the relation fan. That is, Offsets=OffsetR−OffsetN. The pseudo-sink may or may not be located inside source instance 26, since the pseudo-sink is not dereferenced.

As shown in FIG. 5, next sink pointer 42 of sink instance 3 and previous sink pointer 44 of sink instance 1 point to pseudo-sink 54, rather than the first byte of source instance 26. The effect is that relation fan 29 "looks like" the "ToOne" element of a sink instance from the point of view of many relation operations. This reduces complexity and increases execution speed of various relation operations.

All member functions of the "FanPresents" and "isPresentedBy" classes are inline (i.e., they do not require branch or function calls in machine code) and are used to pass the address of "Rel" static member 48 to an out-of-line member function in base class "Fan" 30 and "ToOne" 41, respectively. Therefore, the same programming code is used for all relations, and there is no need to replicate non-trivial code for each relation. In addition to the above, each "FanPresents" and "isPresentedBy" class also has an inline constructor and destructor (constructors and destructors are known in the art). These member functions invoke "construct" and "destruct" member functions on "Fan" class 30 and "ToOne" class 41, respectively, passing the member functions the "Rel" member by reference.

Described above are the data structures used in implementing relations, in accordance with the principles of the present invention. At this time, the ways in which relations are implemented will be described in detail with reference to the flow diagrams in FIGS. 6–10.

Initially, in one embodiment, in order to implement a relation, such as presents relation 20, an initialization procedure takes place. During initialization, the offset values (e.g., "OffsetN, "OffsetP," "OffsetO," "OffsetR," "OffsetL" and "OffsetS") needed by the relation operations being performed on presents relation 20 are computed and stored in a location accessible by the operations. One example of how initialization is accomplished is described in detail herein with reference to FIG. 6.

Figure 6:
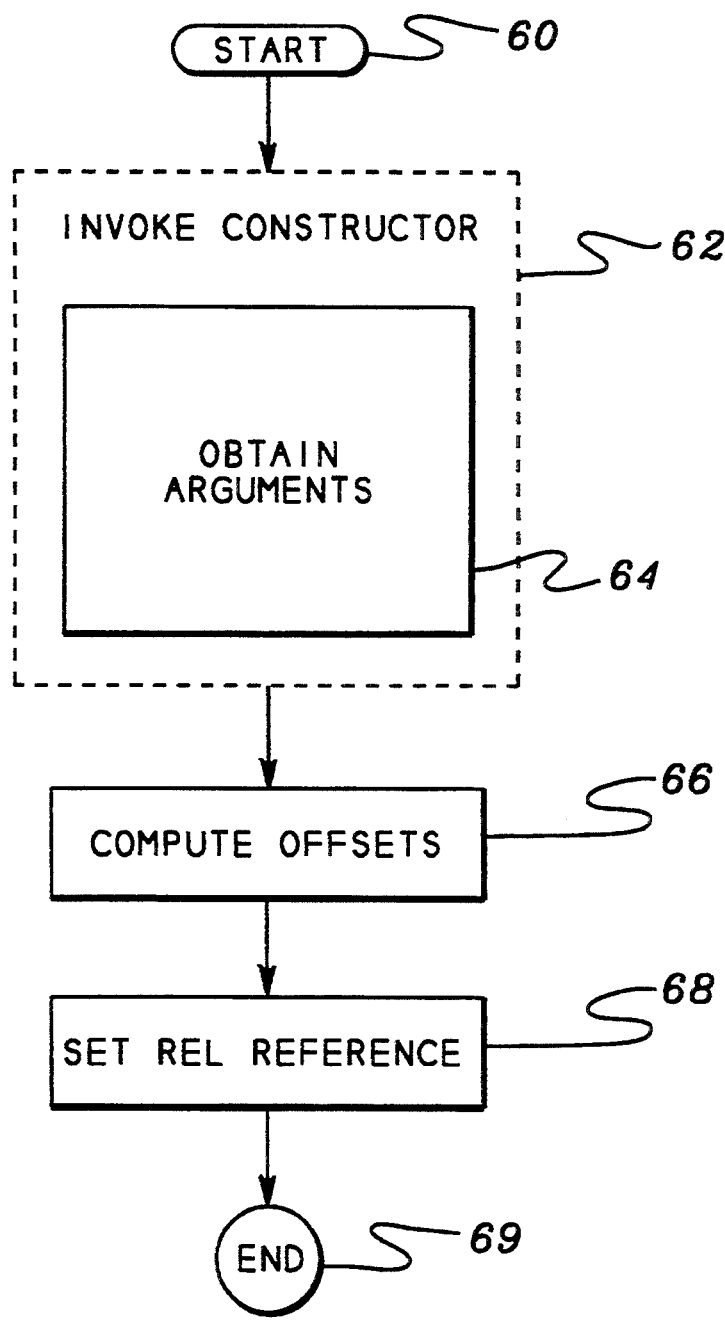
FIG. 6 depicts one example of a flow diagram for initializing offsets of the source and sink instances of the present invention.

In one embodiment, initialization takes place using C++ constructs. Referring to FIG. 6, in order to initialize the offsets member of "Rel" class 48, STEP 60 "Start," a Rel constructor is invoked during instantiation of the "Rel" class for the "presents" relation, STEP 62 "Invoke Constructor." Two arguments are passed to the constructor, one of which is the offset of the "FanPresents" instance in source class 22 and the other is the offset of the "isPresentedBy" data member of sink class 24. In order to obtain these arguments, STEP 64 "Obtain Arguments," an auxiliary class is defined for each schema class as a friend. For example, let SourceO be a friend of source class 22, and let SinkO be a friend of sink class 24. Within SourceO, define a static inline member function which returns the offset of "FanPresents" data member in source class 22. Similarly, within SinkO define a static inline member function which returns the offset of "isPresentedBy" instance in sink class 24. These two member functions return the arguments needed by the Rel constructor, and the completion of this step allows the "FanPresents" class 31 accessibility to the necessary offsets.

The arguments which are passed to the Rel constructor are passed in turn by the Rel constructor to a constructor for its enclosed "Offsets" class 50, which is defined with the same parameters as the Rel constructor. The Offsets constructor uses the parameters to set the values of OffsetR and OffsetN, respectively (the latter through the constructor for its base class OffsetNP). The Offsets constructor and OffsetNP constructor then use the parameters to compute and set the remaining offset values in "OffsetNP" class 52 and "Offsets" class 50, STEP 66 "Compute Offsets."

In addition to the above, in order to perform initialization of the Rel reference of the "isPresentedBy" class, a static inline function is defined in SourceO. This function returns a reference to the Rel instance in the "presents" relation fan, STEP 68 "Set Rel Reference." Thereafter, this function is invoked during initialization of the Rel reference in the "isPresentedBy" class. Subsequently, initialization is complete, STEP 69 "End."

Figure 7:
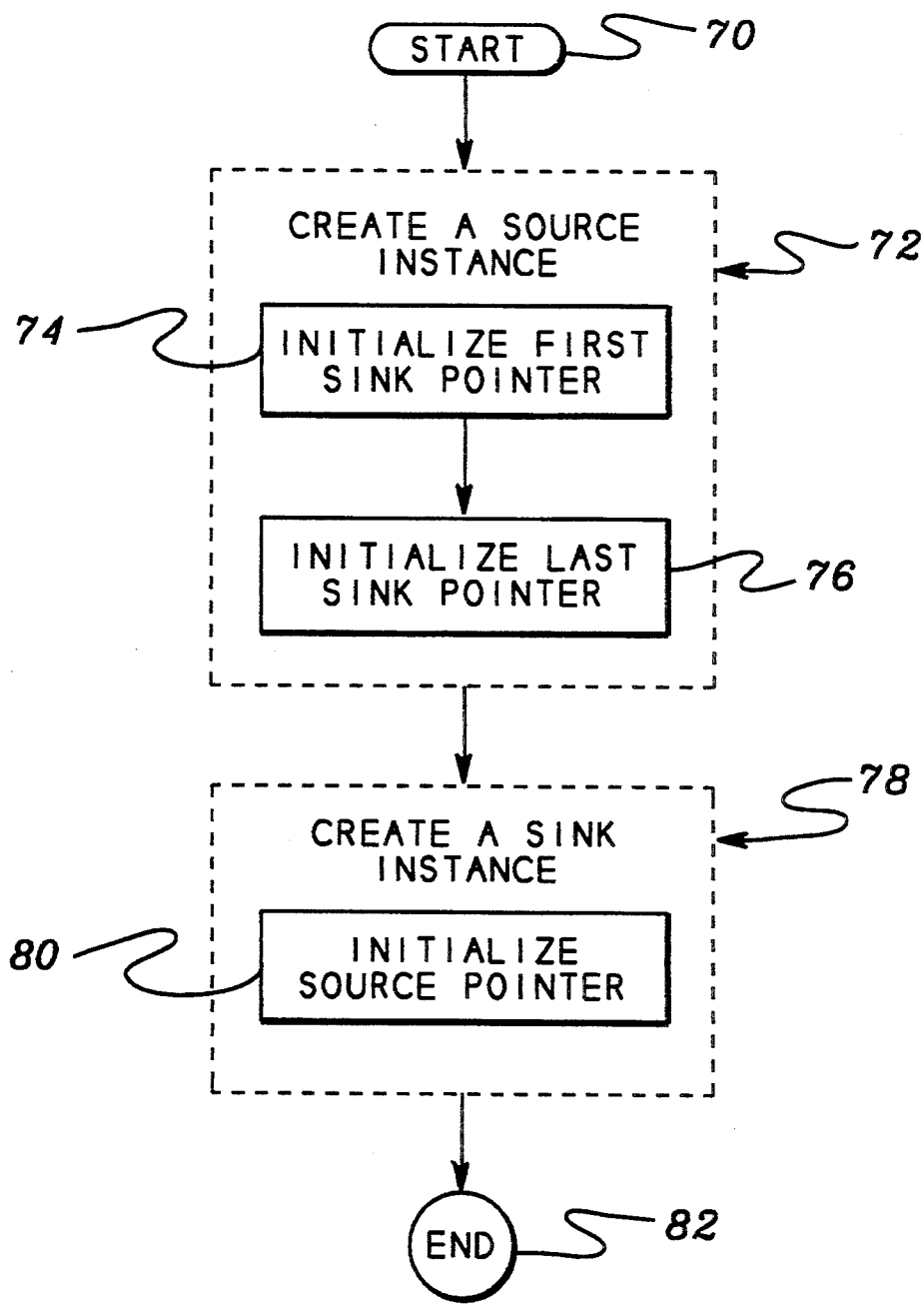
FIG. 7 depicts one example of a flow diagram for creating a source and a sink instance, in accordance with the principles of the present invention.

In one embodiment, in order to implement a relation, source instance 26 and sink instance 28 are created (this is also referred to as instantiation). Referring to FIG. 7, when the instantiation procedure begins, STEP 70 "Start," steps are taken to create a source instance from source class 22, STEP 72 "Create a Source Instance." In order to create source instance 26, first sink pointer 36 and last sink pointer 38 are initialized to the address of pseudo-sink 54 (which is previously determined, as described above), STEP 74 "Initialize First Sink Pointer" and STEP 76 "Initialize Last Sink Pointer," respectively. By setting the first sink and last sink pointers to the address of the pseudo-sink, a degenerate ring with no sink instances is formed. In addition to the above, a sink instance is created from sink class 24, STEP 78 "Create a Sink Instance." In order to create sink instance 28, source pointer 46 is set to null, indicating that the sink instance is not related to a source instance at this time, STEP 80 "Initialize Source Pointer." Subsequent to initializing the first sink, last sink and source pointers, creation of the source and sink instances is complete, STEP 82 "End."

Figure 8:
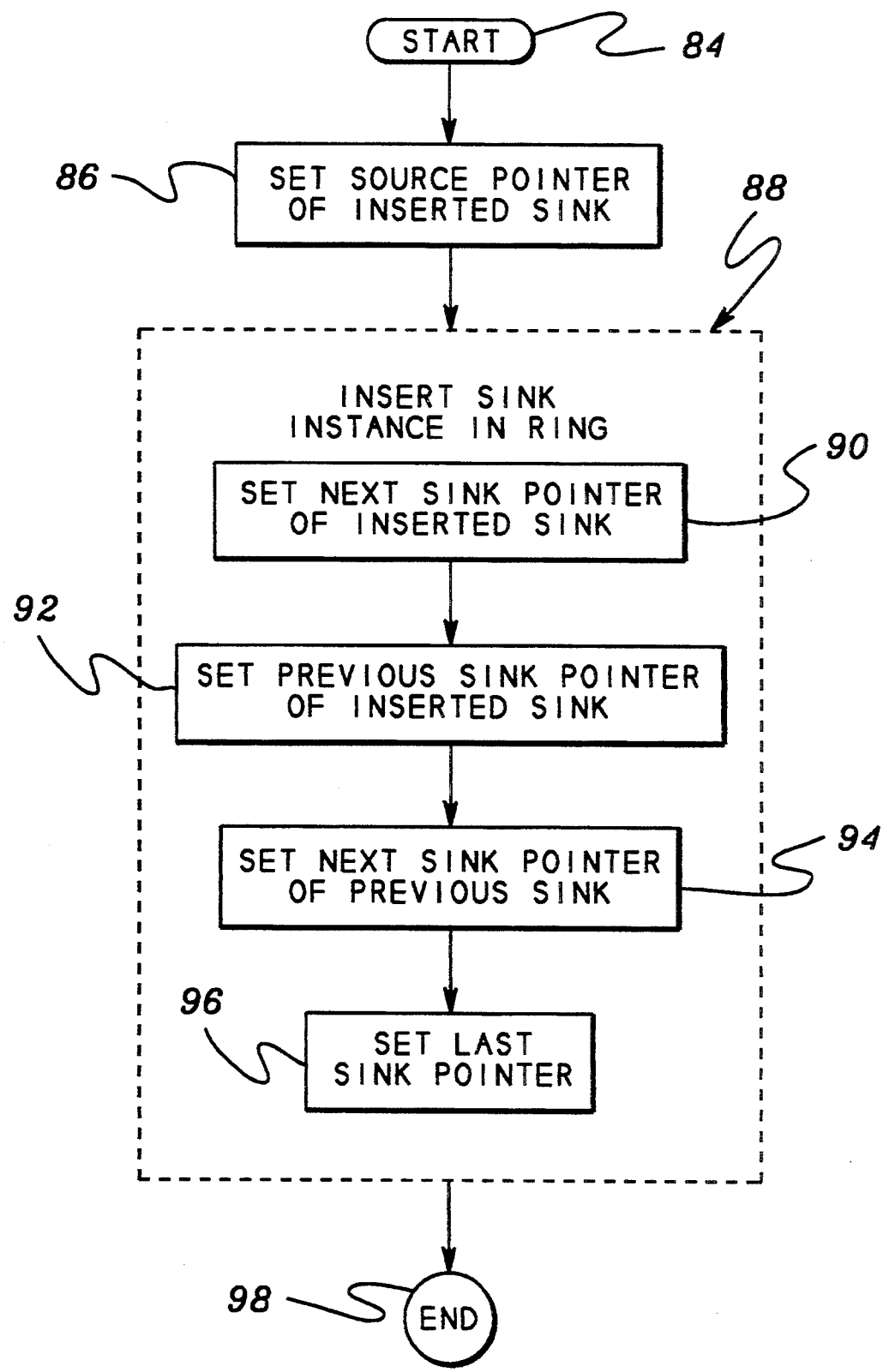
FIG. 8 depicts one example of a flow diagram for inserting a relationship between the source and sink instances created using the procedure depicted in FIG. 7, in accordance with the principles of the present invention.

Subsequent to creating the source and sink instances, a relationship between them is inserted. Referring to FIG. 8, one example of a procedure for inserting a relationship, such as a presents relationship, between a particular source instance 26 and a particular sink instance 28, referred to herein as the inserted sink instance, is described in detail. Subsequent to commencing the inserting procedure, STEP 84 "Start," source pointer 46 of "isPresentedBy" class 40 is set to the address of source instance 26, STEP 86 "Set Source Pointer." In addition to setting the source pointer, sink instance 28 is inserted into the doubly-linked ring of sinks, STEP 88 "Insert Sink Instance in Ring."

In order to insert the relevant sink instance to the end of the doubly-linked ring of sinks, thereby inserting a relationship between source instance 26 and inserted sink instance 28, the following steps are performed:

1. Next sink pointer 42 of the inserted sink instance 28 is set to the address of pseudo-sink 54, STEP 90 "Set Next Sink Pointer of Inserted Sink";
2. Previous sink pointer 44 of the inserted sink instance is assigned from last sink pointer 38 in the instance of the "FanPresents" class in the source instance, STEP 92 "Set Previous Sink Pointer of Inserted Sink";
3. Next sink pointer 42 of the previous sink is set to the address of the inserted sink instance. The previous sink instance is found by following previous sink pointer 44 of "isPresentedBy" class 40. If this is not the first relationship being inserted in this relation fan, next sink pointer 42 is in an instance of the "isPresentedBy" class inside the previous sink. On the other hand, if this is the first relationship being inserted in the relation fan, the next sink pointer 42 is not in a sink instance at all, but is actually the first sink pointer in the instance of the "FanPresents" class in the source instance, STEP 94 "Set Next Sink Pointer of Previous Sink;" and
4. Last sink pointer 38 is set to the address of the inserted sink, STEP 96 "Set Last Sink Pointer." Thereafter, the insertion of a relationship between a source instance and a sink instance is complete, STEP 98 "End".

Similar to the procedure described above, a sink instance can be inserted at the beginning of the ring, before a specified sink or after a specified sink. As described in detail above, insertion of a relationship includes writing into the inserted instance, such as the sink instance, and into two neighboring instances in the doubly-linked ring. In the case of inserting the first relationship of a relation fan, however, the two neighboring instances are the source instance.

Figure 9:
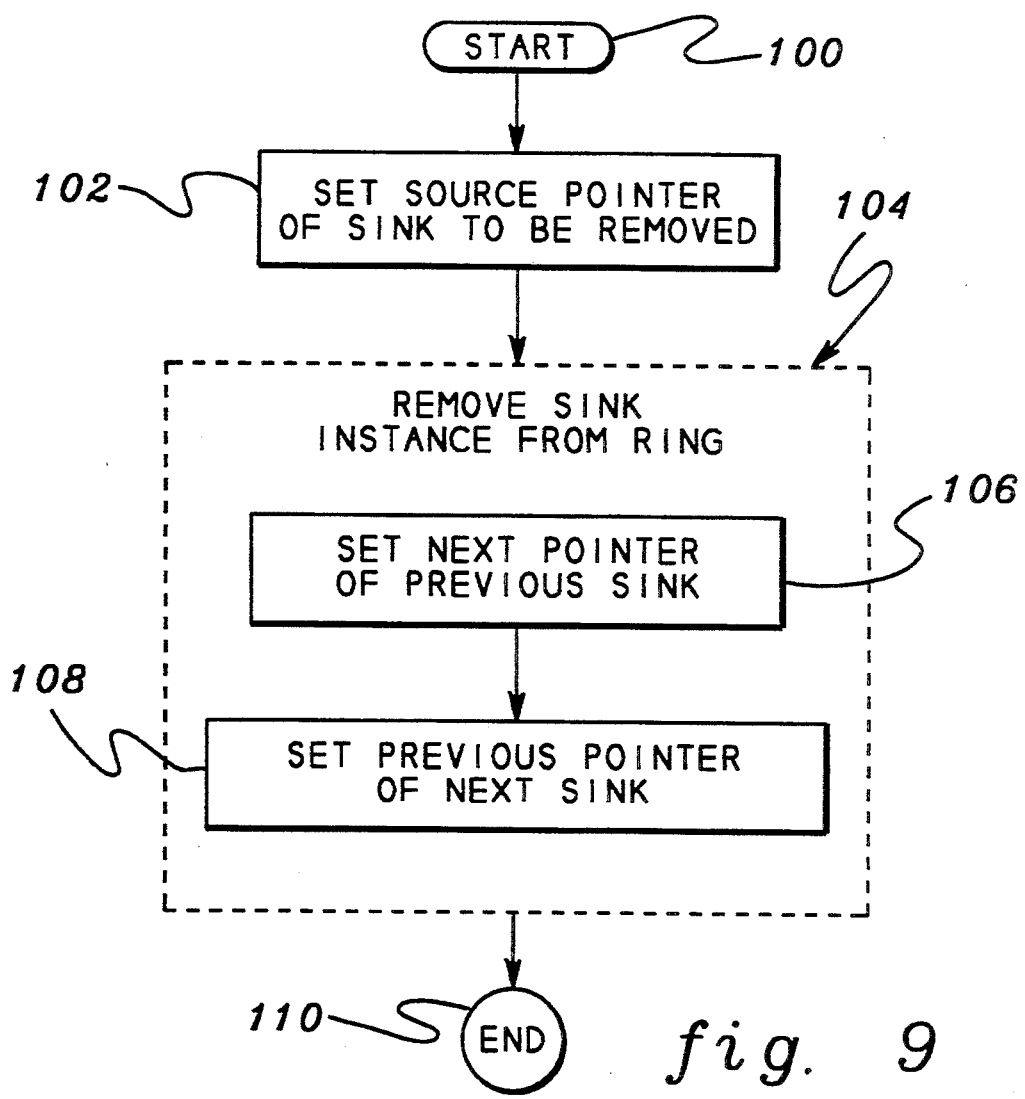
FIG. 9 depicts one example of a flow diagram for removing relationships, in accordance with the principles of the present invention.

In one embodiment, a procedure for implementing relations may also include removing a relationship between a sink instance and a source instance. The manner in which a relationship is removed, in accordance with the principles of the present invention, is described in detail with reference to FIG. 9. Referring to FIG. 9, subsequent to commencing the removal operation, STEP 100 "Start", source pointer 46 of a previously inserted sink instance 28 is set to null, indicating that the sink relationship is being removed, STEP 102 "Set Source Pointer of Sink to be Removed." In addition, the sink instance is removed from the doubly-linked ring of sinks, STEP 104 "Remove Sink Instance from Ring."

As one example, in order to remove a sink instance from the ring of sinks, next sink pointer 42 of the previous sink is assigned from the next sink pointer of the sink being removed, STEP "Set Next Pointer of Previous Sink," and previous sink pointer 44 of the next sink is assigned from the previous sink pointer 44 in the sink being removed, STEP 108 "Set Previous Pointer of Next Sink." After the above procedures are performed, a relationship is removed, STEP 110 "End."

In accordance with the principles of the present invention, the procedures for insertion and removal work correctly in all cases without any conditional logic due to the definition of the pseudo-sink. Similar to insertion, removal includes writing into the instance being removed, such as the sink, and also writing into the two neighboring instances in the triply-linked chain. In the case of removing the only or last remaining relationship of a particular relation fan, the two neighboring relations are the source instance.

The above procedures for inserting and removing a relationship assume that the insertion and removal are unconditional. That is, insertion assumes the sink instance has no "isPresentedBy" relationship and the removal operation assumes the sink instance has an "isPresentedBy" relationship. This condition can be checked by examining whether source pointer 46 is null. A null source pointer is equivalent to the statement that the sink instance has no "isPresentedBy" relationship.

In one embodiment, in addition to the above, it is possible to perform a swap operation in which a sink instance is removed from one source instance and inserted into another source instance. The swap operation of the present invention is similar to the insert and remove operations described above, except that swap may be faster than remove followed by insert, since STEP 102 of the remove operation does not need to be performed.

Figure 10:
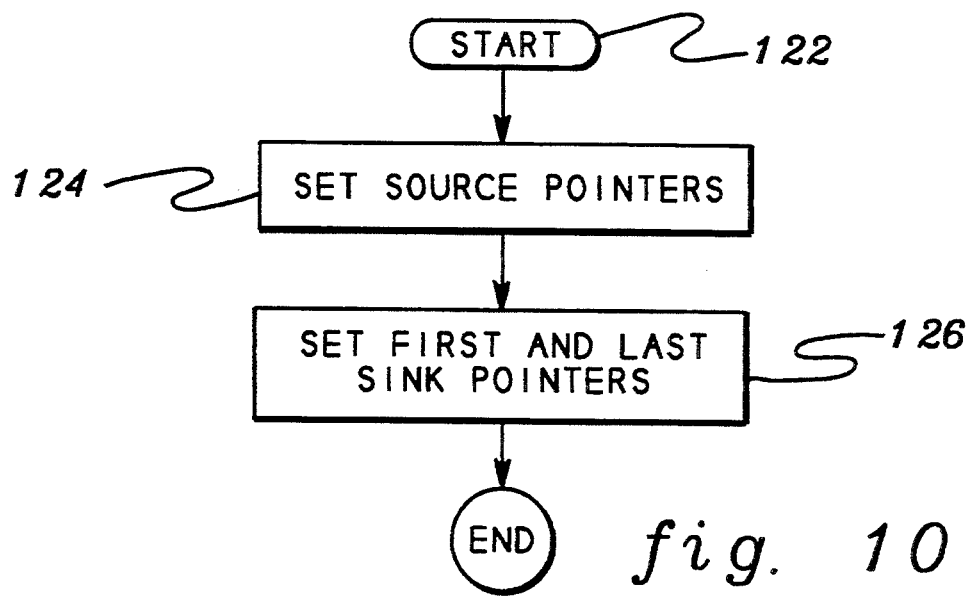
FIG. 10 depicts one example of a flow diagram for a "remove all" operation, in accordance with the principles of the present invention.

In addition to the above operations, it is also possible to define and implement more elaborate operations in order to change more than one relationship at a time. These operations can be implemented more efficiently for the dense one-to-many relations of the present invention than repeated invocation of individual operations. One example of an operation to change more than one relationship at a time is a "remove all" operation. With reference to FIG. 10, the "remove all" operation is described in detail.

Referring to FIG. 10, subsequent to commencing the "remove all" operation, STEP 122 "Start," in one example, each presents relationship on a given source instance can be removed. In order to accomplish this, source pointer 46 in each sink instance is set to null, STEP 124 "Set Source Pointers" and first sink pointer 36 and last sink pointer 38 of source instance 26 are set to the address of the pseudo-sink, STEP 126 "Set First and Last Sink Pointers." (The address of the pseudo-sink is equal to the address of the relation fan - "OffsetN".) This operation is faster than multiple invocations of individual remove operations, since only one pair of ring pointers (first and last sink pointers) need to be set, and not one pair for each and every relationship of relation fan 29.

In addition to the above, another operation that may be performed is a "remove range" operation. The "remove range" operation removes all the sink instances between two specified sinks. The "remove range" operation is performed similarly to the "remove all" operation described above; however, instead of setting first sink pointer 36 and last sink pointer 38, next sink pointer 42 is set to the sink instance which is after the last removed sink instance and previous sink pointer 44 is set to the sink instance which is prior to the first sink instance being removed.

A further operation is a "swapAll" operation which switches all the sink instances from one source instance to another source instance. This operation is performed in a manner similar to the "remove all" operation and the other operations described above. In particular, however, source pointer 46 of each sink instance is set to the address of the new source instance.

Another operation, referred to as an empty query, is used to determine whether a given source instance presents any sink instances. This is accomplished by comparing first sink pointer 36 with the address of pseudo-sink 54, and if they are equal, then no sink instances are presented.

Although the relation implementation technique of the present invention is described above in terms of a single relation, it will be apparent to one of ordinary skill in the art that each class may participate in multiple one-to-many relations, and may inherit relations and attributes from superclasses. Each additional relation may use an additional source class 22 and/or sink class 24 and uses an additional "FanPresents" class 31 and "isPresentedBy" class 40, as shown by the occluded rectangles in FIG. 4.

In one embodiment, iterators or cursors are used for traversing relations. That is, cursor instances are used to iterate through the relationships of each relation fan 29. In particular, in order to traverse from a given source instance to its related sink instances, bidirectional safe cursor instances are used. Described in detail herein are the data structures defined, in accordance with the principles of the present invention, and used in order to implement the cursors, in accordance with the present invention. Initially, the data structures will be described in detail and then, the procedures for implementing and managing the cursors will be described.

Figure 11:
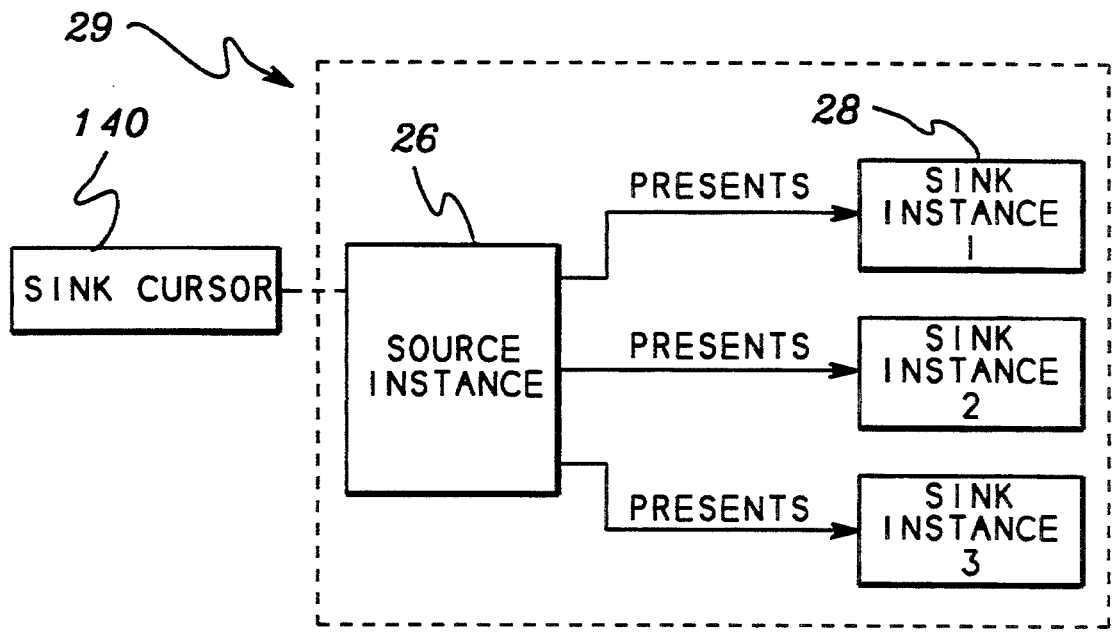
FIG. 11 depicts one example of a cursor instance attached to the relation fan of FIG. 3, in accordance with the principles of the present invention.
Figure 12:
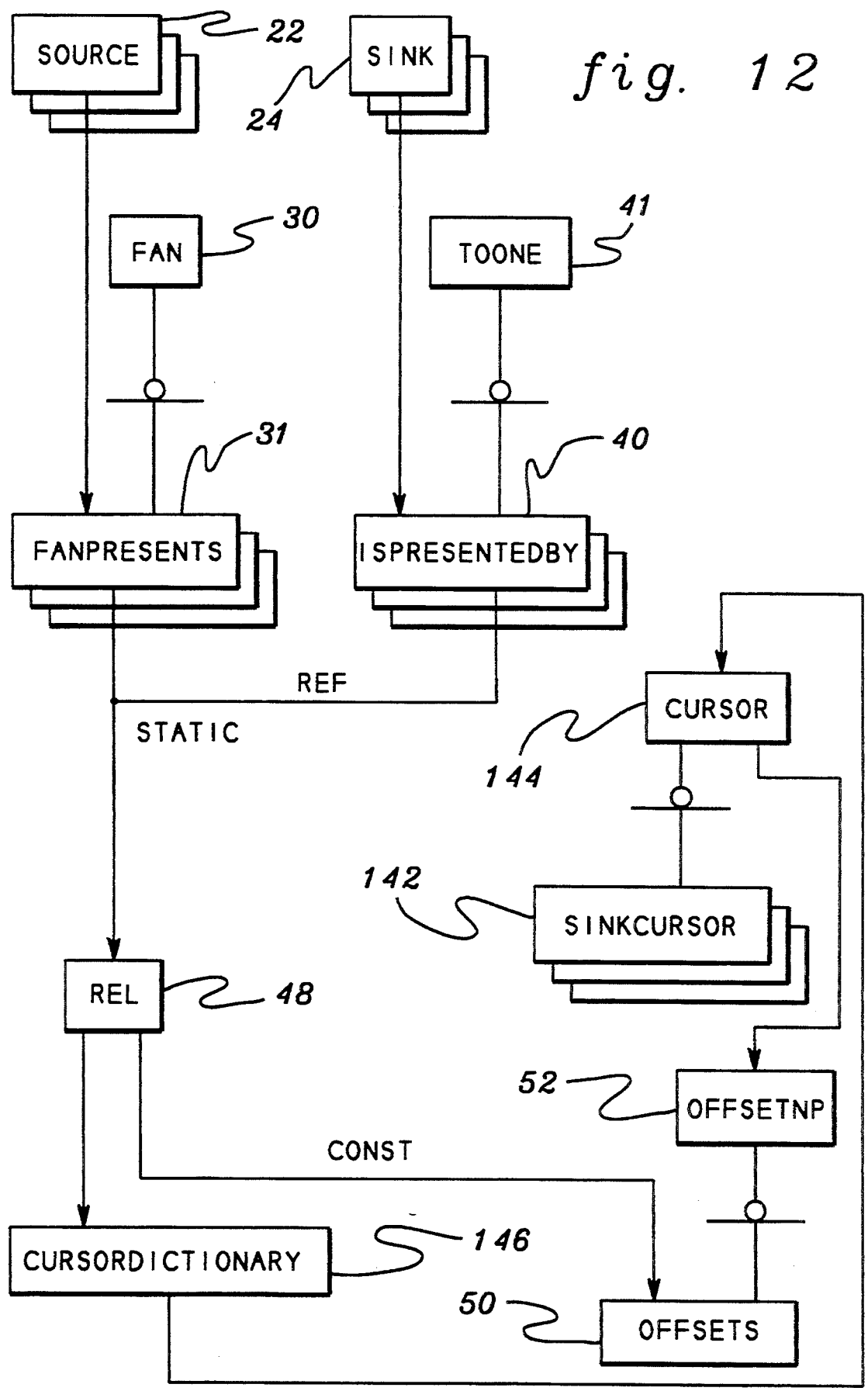
FIG. 12 illustrates one example of an enhanced hierarchy and nesting diagram of FIG. 4, which includes the classes associated with the cursor implementation technique of the present invention.

As shown in FIG. 11, in one example, a sink cursor instance 140 is attached, as described in detail below, to relation fan 29. Sink cursor instance 140 is a bidirectional safe cursor (described below) and is an instance of a class 142 (FIG. 12), referred to as "SinkCursor." (FIG. 12 is an expansion of FIG. 4 and like numbers are for like classes. The occluded rectangles depict the additional classes which may be used for additional relations (i.e., for more than the single "presents" relation described herein). For additional relations, additional "SinkCursor" classes 142 are used.) "SinkCursor" 142 is a derived class of a base class 144, referred to as "Cursor." Since "SinkCursor" class 142 is derived from "Cursor" class 144, it inherits all the properties of "Cursor" class 144. (It will be apparent to one of ordinary skill in the art that there can be numerous other subclasses of "Cursor" class 144 and that "SinkCursor" class 142 is only one illustrative example.) "Cursor" class 144 encapsulates the data related to the cursor operation. This encapsulation is depicted in FIG. 13.

Figure 13:
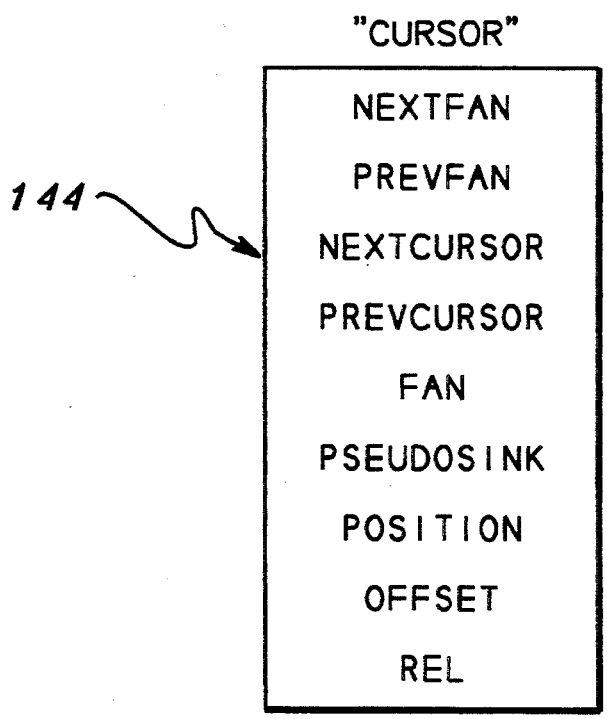
FIG. 13 depicts one example of the encapsulated data members of a cursor class, in accordance with the principles of the present invention.

Referring to FIG. 13, in one example, "Cursor" class 144 includes the data members listed below. If the current cursor (referred to as "this" cursor in the C++ programming language) is not attached to a relation fan, then data items 1–4 and 6–9, described below, are not used:

1. A "nextfan" pointer, which points (contains the address of) to the first cursor instance (e.g., sink cursor instance) attached to the next relation fan of a particular relation (e.g., a "Presents" relation). However, if this is not the first cursor instance of a relation fan, then the "nextfan" pointer is not used.
2. A "prevfan" pointer, which points to the first cursor instance attached to a previous relation fan of a particular relation. However, if this is not the first cursor instance of a relation fan, then the "prevfan" pointer is not used.
3. A "nextCursor" pointer, which points to the next cursor instance attached to the same relation fan as the current cursor instance. Should there be no next cursor instances attached to the same relation fan, then the "nextCursor" pointer is null.
4. A "prevCursor" pointer, which points to the previous cursor instance attached to the same relation fan as the current cursor instance. If there are no previous cursor instances attached to the same relation fan, then the "prevCursor" pointer is null.
5. A "fan" pointer, which points to the relation fan to which the current cursor instance is attached. If the current cursor instance is not attached to a relation fan, then the "fan" pointer is null.
6. A "pseudoSink" pointer, which contains the address of the pseudo-sink of the attached relation fan.
7. A "position" pointer, which contains the current position of the cursor instance in the relation fan.
8. An offset which is of type "OffsetNP" class 52. As shown in FIG. 12, "Cursor" class 144 contains a data member of type "OffsetNP" class 52.
9. A "rel" pointer, which points to an instance of "Rel" class 48.

Figure 14:
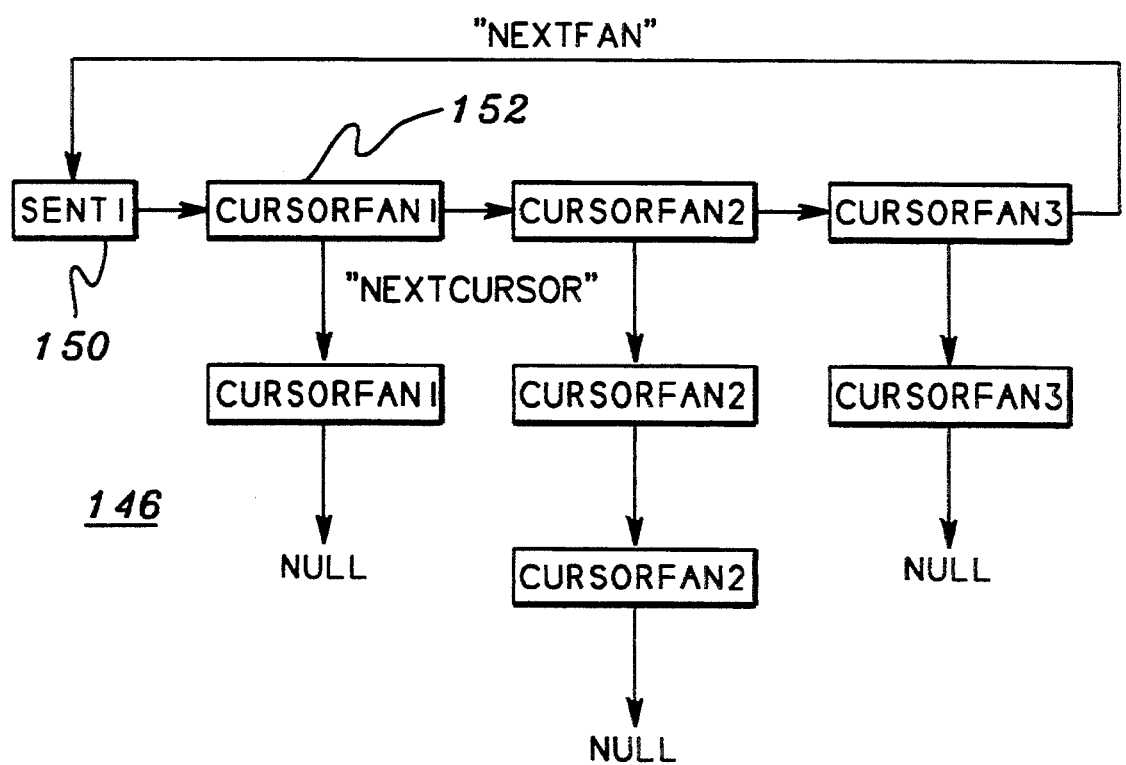
FIG. 14 depicts one example of a cursor dictionary, in accordance with the principles of the present invention.

As shown in FIG. 12, an instance of "Cursor" class 144 is a data member of a class referred to as "CursorDictionary" class 146. An instance of "CursorDictionary" class 146 is a data member of "Rel" class 48 and is used to maintain all of the attached cursor instances (e.g., attached sink cursor instances 140), as described in detail herein. "CursorDictionary" class 146 is constructed as a ring of lists, with each list consisting of all the cursor instances attached to a particular relation fan. As is shown in FIG. 14, both the ring (i.e., first row in FIG. 14) and the lists (i.e., columns in FIG. 14) are doubly-linked. In accordance with the principles of the present invention, there is one cursor dictionary instance for each relation.

Referring to FIG. 14, "CursorDictionary" class 146 includes, for instance, a dummy cursor instance 150 (referred to herein as "sent1") and a number of cursor instances 152. As one example, cursor instances 152 may be equivalent to sink cursor instances 140. However, the invention is not limited to sink cursor instances. In the example shown in FIG. 14, there are a number of cursors for each of three relation fans, Fan1, Fan2 and Fan3, respectively. The horizontal arrows depicted in FIG. 14 (including the bent arrow pointing to dummy cursor 150) represent the "nextfan" pointers in "Cursor" class 144 and the vertical arrows represent the "nextCursor" pointers. The "prevfan" and "prevCursor" pointers are not shown; however, they would point in the opposite direction of the "nextfan" and "nextCursor" pointers, respectively.

As described in detail below, "Cursor" class 144 in cooperation with "Fan" class 30 provide the nontrivial code for cursor functionality. Communication between cursors and relations is achieved by making "Fan" class 30 and "CursorDictionary" class 146 friends of "Cursor" class 144.

Described above are the data structures used in implementing cursors, in accordance with the principles of the present invention. At this point, the manner in which cursor instances are created, used and advanced will be described in detail.

Figure 15:
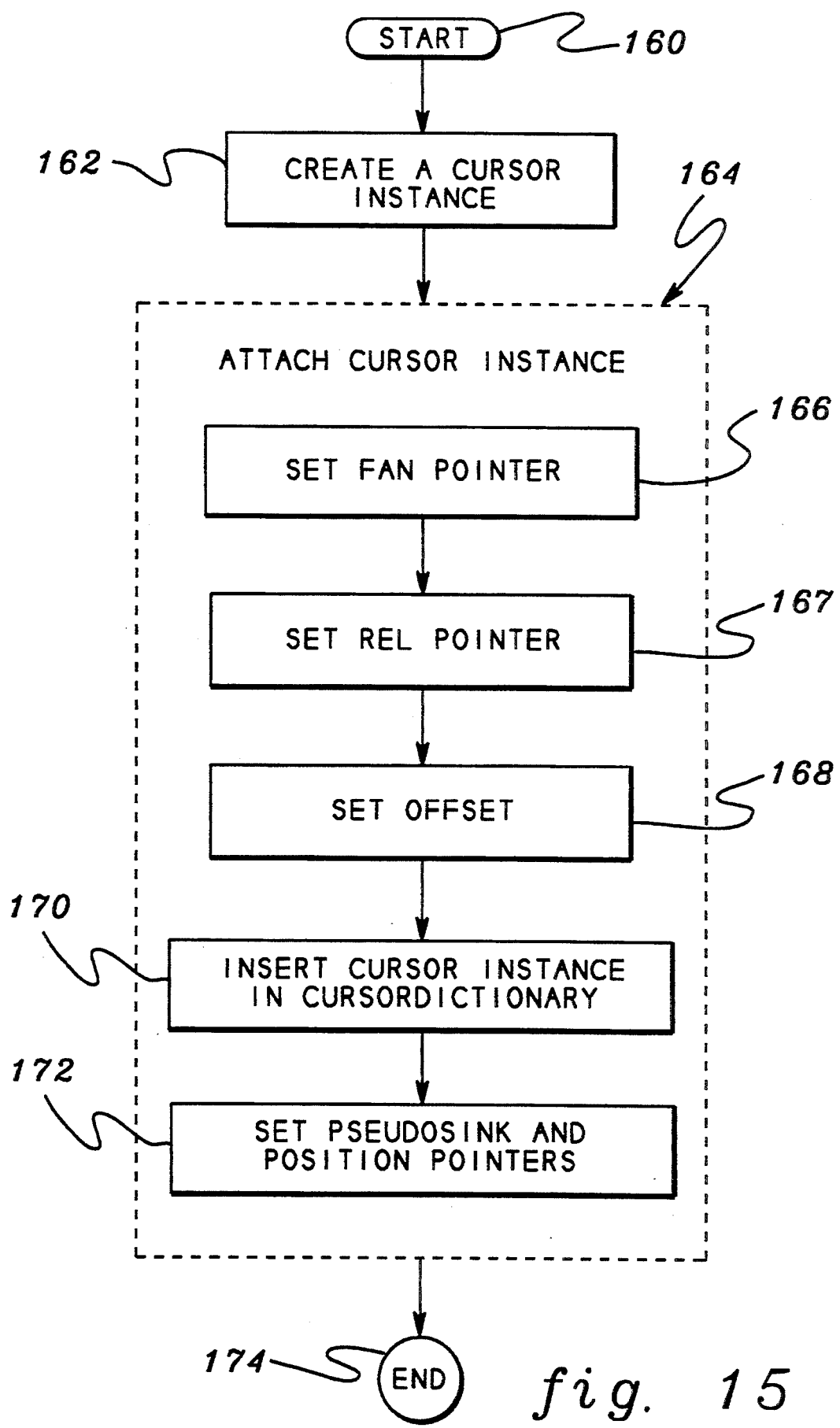
FIG. 15 depicts one example of a flow diagram for implementing a cursor, in accordance with the principles of the present invention.

Referring to FIG. 15, in order to implement a cursor, STEP 160 "Start", a cursor instance is created, STEP 162 "Create a Cursor Instance." A cursor instance may be created from a cursor class in a number of ways. For example, a null constructor may be used to set the "fan" pointer in "Cursor" class 144 to null. A null value indicates that the cursor instance is not attached to any relation fan. As another example, a cursor instance may be created using a copy constructor. When a copy constructor is employed, the value of the "fan" pointer in "Cursor" class 144 is copied, and if the value is not null (indicating attachment to a relation fan), the values of the "pseudoSink", "position", "offset" and "rel" data members in the "Cursor" class are copied. (Assigning a cursor instance to another cursor instance is accomplished in a similar manner to that of copying, as described above.)

Subsequent to creating a cursor instance, in order to implement a cursor, the cursor instance is attached to a relation fan, if this has not been accomplished during creation, STEP 164 "Attach Cursor Instance." In order to attach the cursor instance to a particular relation fan, the following steps are performed:
1. The "fan" pointer in "Cursor" class 144 is set to the address of the relation fan (an inherent step is to determine the address of the relation fan), STEP 166 "Set Fan Pointer."
2. The "rel" pointer is set to point to the rel instance in "FanPresents" class 31, STEP 167 "Set 'rel' Pointer."
3. The "offset" data member in "Cursor" class 144 is set to the value of the "OffsetNP" member in the instance of "Rel" class 48 corresponding to the relation fan.
4. The cursor instance is inserted into "CursorDictionary" 146 of the same Rel instance of class 48. A single cursor instance can be inserted into a cursor dictionary by performing the steps described herein. The first step is to search the ring (i.e., the first cursor instances in the "CursorDictionary" class) sequentially from the beginning, stopping when a cursor instance is found pointing to the same relation fan ("fan" data member of "Cursor" class) as the cursor instance being attached, or when the end of the ring is encountered. If a cursor instance is found pointing to the same relation fan, insert this cursor instance as the second item in the list of cursor instances attached to this relation fan. Otherwise, when the end of the ring is encountered, insert this cursor instance as the first item in the ring, and initialize the list for this relation fan to indicate no additional cursor instances.
5. The "pseudosink" and "position" pointers of "Cursor" class 144 are set to pseudo-sink 54 of the relation fan. (Alternatively, in another embodiment, the "position" pointer can be set to point to a related instance, thus implementing an "attach at" feature.)

Subsequent to performing the above steps, a cursor instance is created and attached to a relation fan, STEP 174 "End."

After attaching a cursor instance, it is possible to detach it from the relation fan by removing it from "CursorDictionary" 146 and setting its "fan" pointer to null. In one embodiment, a single cursor instance can be removed from the cursor dictionary by removing it from the ring and/or list in the following manner: If this is not the first cursor instance attached to a relation fan, then remove the cursor instance from the list of cursor instances attached to this relation fan. Should this be the first cursor instance attached to a relation fan, and there are no additional cursor instances attached to this relation fan, then the cursor instance is removed from the ring of cursors. On the other hand, if this is the first cursor instance attached to a relation fan, and there are additional cursor instances attached to this relation fan, then remove the cursor instance from the ring of cursor instances, and insert the second cursor instance attached to this relation fan in the ring, thus making it the new first cursor instance.

Figure 16:
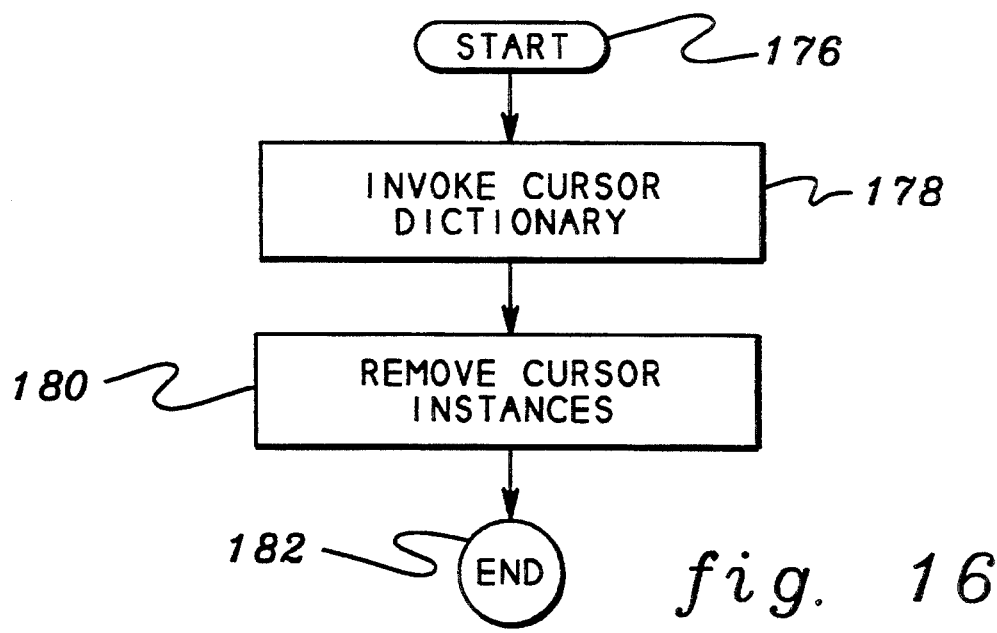
FIG. 16 depicts one example of a flow diagram for removing cursor instances, in accordance with the principles of the present invention.

In addition to the above, if a class instance having attached cursor instances is destroyed, in one example, the attached cursor instances are detached. Referring to FIG. 16, in order to detach the cursor instances from, for example, a source instance, STEP 176 "Start," a function of "CursorDictionary" class 146 is invoked to find the first cursor instance (if any) attached to relation fan 29, STEP 178 "Invoke Cursor Dictionary." In one embodiment, this is accomplished by searching the ring of the cursor dictionary sequentially from the beginning, stopping when a cursor instance is found pointing (using the "fan" data member) to the relation fan of the class instance being destroyed. If such a cursor instance is found, it is removed from the ring of the "CursorDictionary" class, STEP 180 "Remove Cursor Instances." This operation implicitly removes the entire list of cursor instances attached to this relation fan from the cursor dictionary, without requiring explicit action on the other cursor instances in the list, STEP 182 "End."

The advancement of a cursor instance through the relation fan is a frequently invoked operation and thus, it is important to minimize its execution time. In one embodiment, the advancement operation is implemented as an inline member function in order to decrease the execution time of the operation. The advancement operation is described in detail with reference to FIG. 17.

Figure 17:
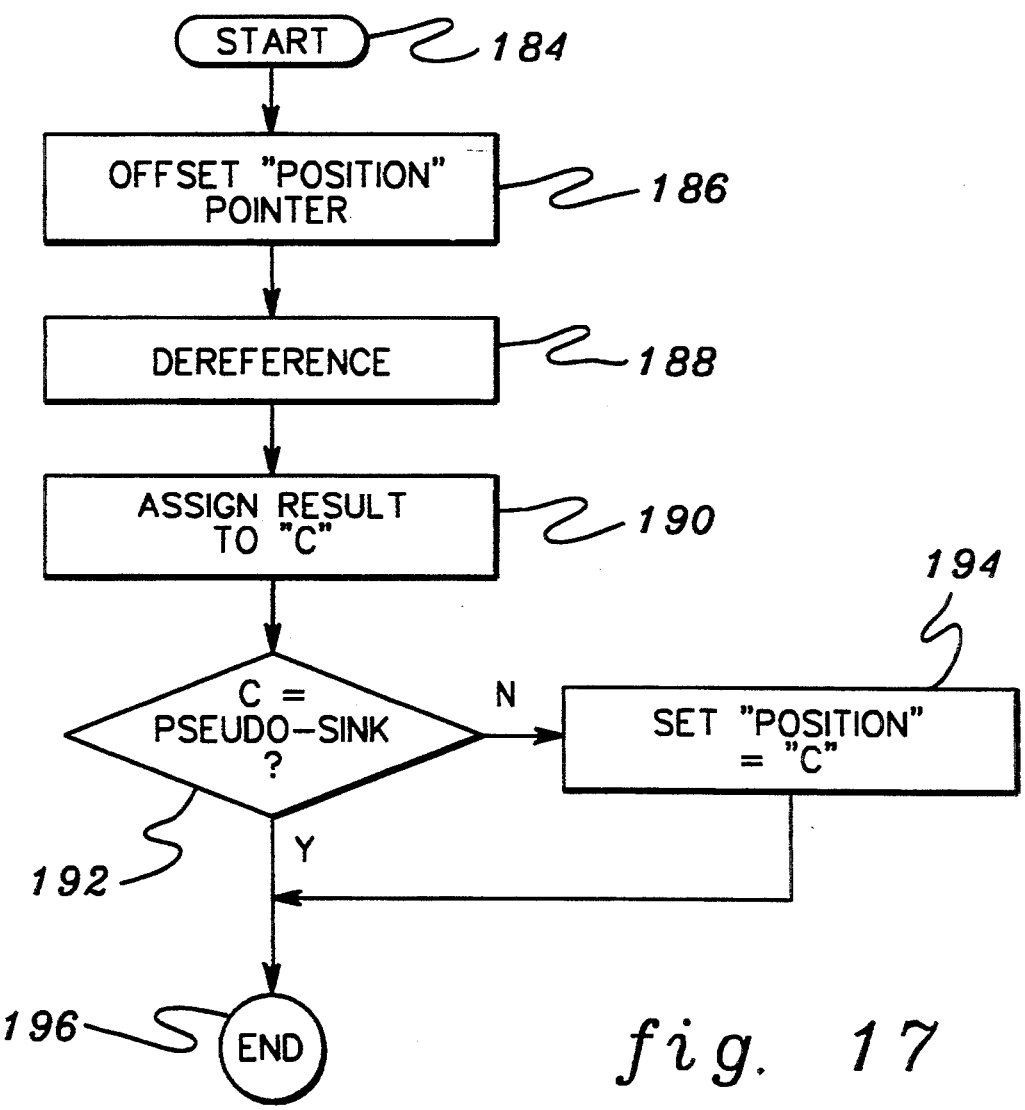
FIG. 17 depicts one example of a flow diagram for advancing a cursor, in accordance with the principles of the present invention.

Referring to FIG. 17, in order to advance a cursor, STEP 184 "Start" initially, the "position" pointer in "Cursor" class 144 is offset by the value of "OffsetN" of the cursor class, STEP 186 "Offset 'position' Pointer." Thereafter, the result of the offset step is dereferenced and assigned to a temporary pointer, called "c", STEP 188 "Dereference" and STEP 190 "Assign Result to 'c'." Subsequently, "c" is examined to determine whether it is equal to the "pseudoSink" pointer in "Cursor" class 144, INQUIRY 192 "C=PseudoSink? " If "c" is not equal to the "pseudoSink," then the "position" pointer in the cursor class is set to "C", thus advancing the cursor. However, should "c" be equal to the "pseudosink," then the cursor is at the end of the relation fan and the cursor is not advanced, STEP 196 "End." (It will be apparent to one of ordinary skill in the art that there are numerous ways in which the above operations may be performed, and only one example is provided herein.)

Figure 18:
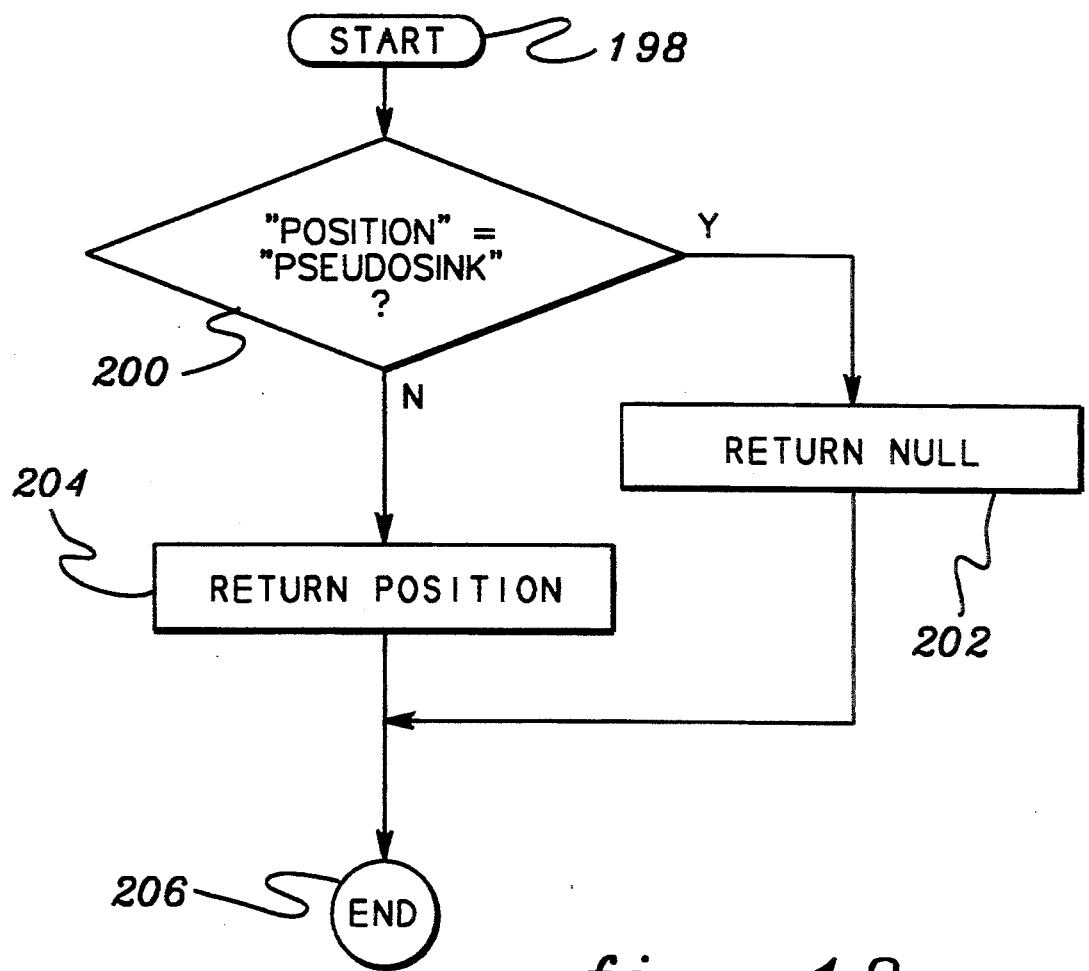
FIG. 18 depicts one example of a flow diagram for returning a related object, in accordance with the principles of the present invention.

In addition to advancing the cursor, a request may be made to return the address of the related instance (e.g., in this example, it is a related sink instance). As with the advancement operation, the return operation should be implemented as an inline member function. The steps associated with the return operation are described in detail with reference to FIG. 18.

When the return operation is commenced, STEP 198 "Start," a determination is made as to whether the "position" pointer of the cursor instance is equal to the "pseudoSink" pointer of the "Cursor" class, INQUIRY 200 "Position=PseudoSink? " Should the "position" pointer be equal to the "pseudoSink" pointer, then a null is returned indicating that the cursor instance is not positioned at any sink instance of the relation fan, STEP 202 "Return Null." On the other hand, if the "position" pointer is not equal to the "pseudoSink" pointer, then the "position" pointer is returned, STEP 204 "Return 'Position'." Subsequent to returning either null or the "position" pointer, the return operation is complete, STEP 206 "End." In one embodiment, advancement and return may be packaged together.

In accordance with the principles of the present invention, when relationships are inserted no special action is required on the part of the cursor instances.

However, when a relationship is removed, all cursor instances attached to the relation fan should be checked to see if their position is the removed relationship. In one embodiment, in order to find the cursor instances, the first cursor instance attached to the relation fan for which the relationship is removed is located using the same search technique described previously for destroying a class instance with attached cursors. In particular, the ring of the cursor dictionary is searched sequentially until a cursor instance pointing to the relation instance is found. Subsequent to finding the first (if any) such cursor instance, the list of cursor instances attached to this relation fan is examined and set-back as appropriate, as described below.

If the position of a cursor instance is the removed relationship, the position of the cursor instance should be set-back. That is, the cursor "position" pointer is offset by the value of "OffsetP" within "OffsetNP" 52 of the "Cursor" class, and the result is dereferenced and assigned to the "position" pointer. (Note that the cursor's "OffsetP" value is equal to the "OffsetP" value of "Rel" class 48, if the cursor direction is forward and it is equal to the "OffsetN" value of "Rel" class 48, if the cursor direction is backward.) This technique provides for iteration safety.

In addition to being iteration safe, the cursor instances of the present invention are type safe. That is, the cursor instances return pointers of the correct type (e.g., pointer-to-sink) to an application program, thus exploiting an important benefit of strongly typed languages, such as, for example, C++. Type safety implies that there is a different class of cursors for each class of objects to be iterated over. In order to achieve type safety, cursor subclasses, such as "SinkCursor" class 142, are used. The member functions in the cursor subclasses are type-specific inline functions which invoke the out-of-line functions, which reside in "Cursor" base class 144. Users of the cursor subclasses also inherit member functions from the cursor base class. In one embodiment, to provide type safety, each schema class has its own cursor class.

In accordance with the principles of the present invention, a bidirectional operation is provided wherein the cursor can be advanced either forward or backward and the cursor is set back for iteration safety. When a cursor is attached, it is in the forward state. The "Offset" member of the "Cursor" class, which includes "OffsetN" and "OffsetP," is copied from "OffsetNP" of the "Rel" class. In order to put the cursor in a backwards state, the "OffsetN" and "OffsetP" values of the cursor are interchanged. This causes advancement and set-back to go in the opposite direction from before.

Described above are preferred embodiments for implementing relations and cursors. However, various modifications may be made to the preferred embodiments. The following modifications are only examples of the changes that can be made. Numerous other changes can also be made without departing from the spirit of the invention.

As one example, in another embodiment, next sink pointers 42 (FIG. 5) and previous sink pointers 44 can point to the offset within a sink instance of "isPresentedBy" class 40, instead of directly to the sink instance. With this implementation, the pseudo-sinks are inside the source instances. Further, with this technique slightly more time is required to return the position of a cursor instance.

Further, in another embodiment, instead of having previous sink pointer 44 of first sink instance 32 and next sink pointer 42 of last sink instance 34 point to pseudo-sink 54, they can point directly to source instance 26.

In addition in another embodiment, instead of having a single cursor class per schema class, there can be one cursor class per relation. This may require more cursor classes, but allows cursors to return a pointer to the source class in a type safe way. This means that there may be multiple cursor classes per schema class, if the schema class is the sink of multiple relations.

Yet, in another embodiment, it is possible to use only two of the data members of "Offsets" class 50 (i.e., "OffsetR" and "OffsetN") instead of all six data members, as in the preferred embodiment. This reduces the amount of data stored per relation in the load module or executable. However, it also requires that the other four offsets ("OffsetP," "OffsetO," "OffsetL," and "OffsetS) be computed dynamically when needed, thus degrading system performance.

In addition to the above, in one embodiment, unidirectional one-to-many binary relations are implemented. The data structures and implementation procedures for unidirectional relations are similar to that of the bidirectional one-to-many binary relations described in detail above, except that unidirectional relations do not include source pointer 46 (FIG. 5) of the sink instances. Therefore, the procedures described above may be easily adapted in order to implement unidirectional relations.

In yet another embodiment, implementations of cursor dictionaries other than the one described herein may be used. For example, an implementation found in class libraries for object-oriented systems may be used. These other implementations may not require one or more of the following data members of "Cursor" class 144: "nextfan," "prevfan," "nextcursor" and/or "prevcursor." Using a different dictionary technology tends to provide a different design point for applications. An advantage of using a dictionary from a class library may be improved performance, if a very large number of attached cursors per relation are used simultaneously. A disadvantage of this variant is that performance may be worse if only a small number of attached cursors per relation are used simultaneously.

Described above are methods for implementing one-to-many binary relations in an object-oriented data repository and implementing cursors to be used with these relations. In summary, doubly-linked rings of objects are used in the design and implementation of one-to-many binary relations used in object-oriented database management systems and object-oriented data models. The two halves of a relation are bound to each other by offset values in static data members, shared by both halves using a reference from one half to the other.

A high-function cursor object and a cursor dictionary object achieve forward and reverse advancement of iteration-safe and type-safe cursors. The direction of advancement can be dynamically switched; this switching simultaneously reverses the set-back direction. The execution speed for advancement, returning related objects, and switching direction is very fast. When a schema class object is destroyed, attached cursors can be detached efficiently.

As described herein, the implementation of the dense one-to-many relations advantageously does not use collection classes. Therefore, the implementation of the one-to-many relations of the present invention eliminates the possibility of multiple relationships between two given objects. That is, the data structures of the present invention have no way to represent such multiple relationships.

In addition to the above, the execution time to insert or remove relationships is less than with other approaches, since no dynamic storage allocation or freeing is required with the approach of the present invention, neither for relation manipulation nor cursor operations. All necessary storage is pre-allocated. Thus, the one-to-many relations of the present invention run an order of magnitude or more faster than any other known relations on representative operations in main storage.

Another advantage of the relation implementation of the present invention is that if most or all potential relationships are used, an important practical case, the space required in the data model, is less than with other approaches. For each relation, only two pointers are used in each source instance and only three pointers are used in each sink instance. Thus, for large relation fans (many sink instances per source instance) the space in the source instance becomes negligible, and only three pointers per relationship are needed.

Further, the amount of space in a load module or executable needed to support the one-to-many relations and cursors of the present invention is very low, when many of those relations and cursors must be supported. For every relation after the first, only a small amount of additional space overhead is required. For every cursor class after the first, no additional space overhead is required.

The dense one-to-many relations of the present invention can provide many useful functions. For example, the relationships in a relation fan appear in a well-defined, stable order. Member functions can be provided which allow applications to insert relationships in a particular order, to change the order of existing relationships, to swap related sink instances from one source instance to another, either singly or in groups, and to remove groups of relationships all at once, as examples.

In addition, the dense one-to-many relations of the present invention can be employed in such a way that relationships can be inserted or removed without access to source instances. This is a significant advantage in cases where a user may have write access to a database containing sink instances, but no access, or only read access to a database containing related source instances. This can be accomplished as follows, in accordance with the principles of the present invention:

a. Create a source instance "s" in an object-oriented database "d1."
 b. When another database "d2" is created to contain some related sink instances, create two dummy sinks in "d2," called "first" and "last." Insert an "isPresentedBy" relationship from each of these dummy sinks to "s," in such a way that "first" occurs just before "last" in the relation fan of "s." This initialization step requires write access to "d1," or to another database containing sinks in the relation fan of "s." The two dummy relationships to "first" and "last" are not to be removed so long as "d2" continues to exist.
 c. Whenever another "isPresentedBy" relationship is to be inserted from "d2," insert the relationship before "last." According to the procedures of the present invention, such insertions, and any subsequent removals, will not require read or write access to "s."

As a further advantage of the implementation techniques of the present invention, coupling among schema classes is simple. Only a single friend class is used for each schema class, together with offset values specific to each relation. Two classes are friends of the "Cursor" class. As an example, a single one-to-many relation is implemented by using a pair of subclasses (i.e., "FanPresents" and "isPresentedBy"), which are coupled through relation-specific offset values contained within the subclasses. The offset values are static members in the subclasses and are passed to member functions in the respective base classes ("Fan" and "ToOne," respectively) of the subclasses.

Further, iterating through a relation fan using the cursor operation of the present invention is extremely fast and no function calls are needed. In addition, the cursor instances can dynamically change direction in a rapid fashion, to advance either forward or backwards.

In accordance with the principles of the present invention, the cursors of the present invention are iteration-safe, in the sense that if any relationship is removed, the position of the cursor instance is setback, if necessary. As used herein, "back" is in accordance with the directional state of the cursor instance, and is opposite to the advancement direction. Thus, different cursor instances pointing to the same sink instance may be set back in opposite directions when the relationship to that instance is removed.

In addition to the above, the cursor instances of the present invention are type safe. That is, there is a different type of cursor instance for each type of related object or instance. This exploits the type safety of strongly typed programming languages such as, for example, C++. There is no execution-time overhead for this type safety.

Further, when a schema class instance is destroyed, any cursor instances attached to any relation fans are automatically and efficiently detached. Applications can query the state of attachment of a cursor instance, in order to determine whether it makes sense to continue iterations.

Yet further, there are no pointers from persistent storage (schema class instances) to nonpersistent storage (cursor instances). Therefore, cursor instances can be attached to source instances for which the process has only read access. (Note that, with the dense one-to-many relations of the present invention, relationships can sometimes be removed even though the process has only read access to the attached source instance.)

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for implementing a one-to-many binary relation in an automated object-oriented data repository, said method comprising the steps of:
    creating within said automated object-oriented data repository a source instance from a source class and a plurality of sink instances from a sink class;
    storing within said source instance a first sink pointer for pointing to a first sink instance of said plurality of sink instances and a last sink pointer for pointing to a last sink instance of said plurality of sink instances;
    storing within each of said sink instances a next sink pointer for pointing to a next sink instance of said plurality of sink instances when a next sink instance exists or a pseudo-sink address associated with said source instance when there is no next sink instance, and a previous sink pointer for pointing to a previous sink instance of said plurality of sink instances when there is a previous sink instance or said pseudo-sink address when there is no previous sink instance; and
    inserting a binary relationship between said source instance and each of said plurality of sink instances by setting said first sink pointer to said first sink instance, said last sink pointer to said last sink instance, said next sink pointer to said next sink instance if there is a next sink instance or said pseudo-sink address if there is no next sink instance, and said previous sink pointer to said previous sink instance if there is a previous sink instance or said pseudo-sink address if there is no previous sink instance.

2. The method of claim 1, further comprising storing a source pointer within each of said plurality of sink instances, each source pointer pointing to said source instance.

3. The method of claim 1, wherein said creating step comprises the step of setting said first sink pointer and said last sink pointer stored within said source instance to said pseudo-sink address.

4. The method of claim 2, wherein said creating step further comprises the step of setting said source pointer in each of said plurality of sink instances to null.

5. The method of claim 2, further comprising adding an additional sink instance to said plurality of sink instances, said additional sink instance comprising a next sink pointer for pointing to a next sink instance of said plurality of sink instances when a next sink instance exists or said pseudo-sink address when there is no next sink instance, a previous sink pointer for pointing to a previous sink instance of said plurality of sink instances when there is a previous sink instance or said pseudo-sink address when there is no previous sink instance and a source pointer for pointing from said additional sink instance to said source instance.

6. The method of claim 5, wherein said sink instance adding step comprises the steps of:
    setting said source pointer of said additional sink instance to an address of said source instance;
    setting said next sink pointer of said additional sink instance to said pseudo-sink address;
    setting said previous sink pointer of said additional sink instance to a value of said last sink pointer;
    setting said first sink pointer to an address of said additional sink instance if no sink instances other than said additional sink instance exists;
    setting said next sink pointer of a sink instance other than said additional sink instance to said address of said additional sink instance if said sink instance other than said additional sink instance exists; and
    setting said last sink pointer to said address of said additional sink.

7. The method of claim 2, wherein said inserting step comprises the step of determining whether said relationship previously exists.

8. The method of claim 7, wherein said determining step comprises the step of examining said source pointer of each of said plurality of sink instances to determine whether said source pointer is null, and wherein said null source pointer indicates no previous relationship exists.

9. The method of claim 2, further comprising the step of removing a relationship between said source instance and one of said plurality of sink instances.

10. The method of claim 9, wherein said removing step comprises the steps of:
selecting a sink instance to be removed from said plurality of sink instances;
setting said source pointer of said selected sink instance to null; and
removing said selected sink instance from said plurality of sink instances.

11. The method of claim 1, further comprising the step of implementing an iterator for use in iterating through said one-to-many binary relation.

12. The method of claim 11, wherein the iterator implementing step comprises the steps of:
creating an iterator instance from an iterator class, said iterator instance comprising one or more data members for use in traversing a one-to-many binary relation, said one or more data members being stored within said iterator instance; and
attaching said iterator instance to said source instance, wherein an attached iterator is provided.

13. The method of claim 12, wherein said one or more data members comprise a pseudo-sink pointer containing an address associated with said source instance, and a position pointer indicating a current position of said iterator.

14. The method of claim 13, further comprising the step of advancing said attached iterator.

15. The method of claim 14, wherein the advancing step comprises the steps of:
offsetting said position pointer by a predetermined value such that a temporary pointer is provided;
dereferencing said temporary pointer in order to obtain a value stored at an address pointed to by said temporary pointer and assigning said value to said temporary pointer;
determining whether said temporary pointer is equal to said pseudo-sink pointer; and
advancing said attached iterator instance by setting said position pointer to said temporary pointer when said determining step indicates said temporary pointer is not equal to said pseudo-sink pointer.

16. The method of claim 13, further comprising the step of returning an address of one of said plurality of sink instances related to said source instance.

17. The method of claim 16, wherein said returning step comprises the steps of:
determining whether said position pointer is equal to said pseudo-sink pointer; and
returning said position pointer when said determining step indicates said position pointer is not equal to said pseudo-sink pointer.

18. The method of claim 12, further comprising the step of inserting said iterator instance in an iterator dictionary.

19. The method of claim 11, wherein said iterator is capable of operating in a forward direction and a backward direction.

20. The method of claim 19, wherein said operating direction of said iterator is capable of being dynamically switched.

21. The method of claim 2, further comprising the step of removing each of said binary relationships, said removing step comprising the steps of:
setting each of said source pointers to null; and
setting said first sink pointer and said last sink pointer to said pseudo-sink address.

22. The method of claim 15, wherein said predetermined value is obtained from an offset data member stored within said iterator instance.

23. The method of claim 12, wherein said attaching step comprises the steps of:
setting at least one of said one or more data members to a predetermined value; and
inserting said iterator instance in an iterator dictionary.

24. The method of claim 23, further comprising the step of detaching said iterator instance that has been attached.

25. The method of claim 24, wherein said detaching step comprises the steps of:
removing said iterator instance from said iterator dictionary; and
setting one of said one or more data members to null.

26. The method of claim 23, further comprising the step of removing said iterator instance from said iterator dictionary.

27. The method of claim 26, wherein said removing step comprises the steps of:
removing said iterator instance from a list of iterator instances associated with said source instance if said iterator instance is not a first iterator instance attached to said source instance;
removing said iterator instance from a ring of iterator instances if said iterator instance is a first iterator instance associated with said source instance; and
making an existing second iterator instance a first iterator instance in said ring.

28. The method of claim 12, wherein a plurality of iterator instances are attached to said source instance and are inserted into an iterator dictionary.

29. The method of claim 28, further comprising the step of removing said plurality of iterator instances when said source instance is deleted, and wherein said removing step comprises the step of removing a first iterator instance of said plurality of iterator instances from said iterator dictionary, wherein said removal removes each of said plurality of iterator instances from said iterator dictionary.

30. The method of claim 11, further comprising the step of providing iteration safety when one of said binary relationships is removed.

31. The method of claim 30, wherein said providing step comprises the step of setting back a data member stored within said iterator instance using a predetermined value, said iterator instance corresponding to said relationship to be removed.

32. The method of claim 31, wherein said data member comprises a position pointer indicating a position of said iterator instance, and wherein said setting back step further comprises the steps of:
offsetting said position pointer by said predetermined value such that a temporary pointer is provided; and
dereferencing said temporary pointer in order to obtain a value stored at an address pointed to by said temporary pointer; and
assigning said value to said position pointer.

33. The method of claim 20, wherein switching of said operating direction comprises the step of interchanging predetermined values of a first data member and a second data member associated with said iterator.

* * * * *